William F. Eames.

June 16, 1953  W. F. EAMES  2,642,158
SELECTIVELY ZONED ELEVATOR SYSTEM
Filed Sept. 2, 1950  13 Sheets-Sheet 3

WITNESSES:

INVENTOR
William F. Eames.
BY
ATTORNEY

June 16, 1953 — W. F. EAMES — 2,642,158
SELECTIVELY ZONED ELEVATOR SYSTEM
Filed Sept. 2, 1950 — 13 Sheets-Sheet 5

WITNESSES:

INVENTOR
William F. Eames.
BY
ATTORNEY

June 16, 1953  W. F. EAMES  2,642,158
SELECTIVELY ZONED ELEVATOR SYSTEM
Filed Sept. 2, 1950  13 Sheets-Sheet 8

WITNESSES:

INVENTOR
William F. Eames.
BY
ATTORNEY

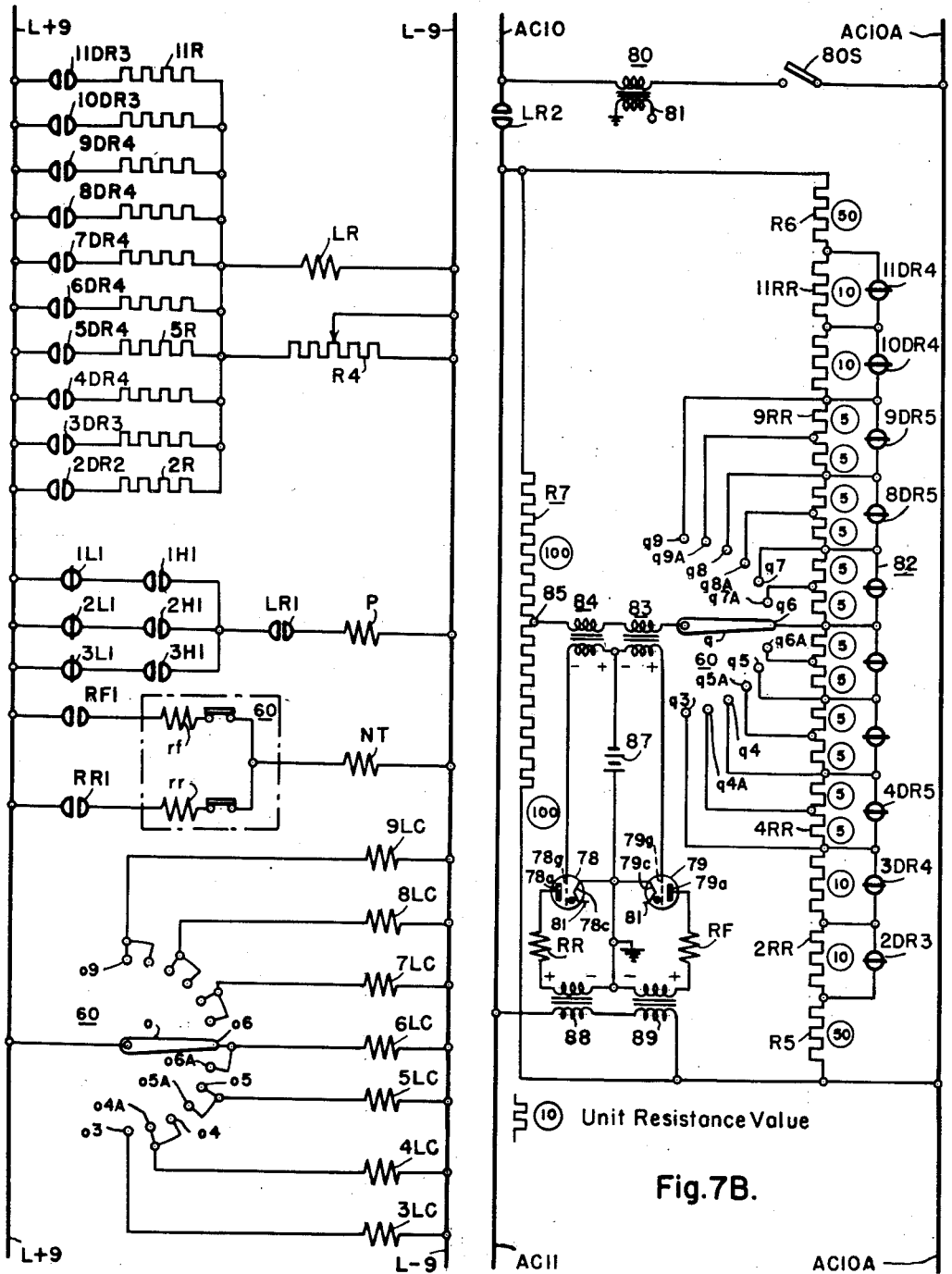

June 16, 1953 — W. F. EAMES — 2,642,158
SELECTIVELY ZONED ELEVATOR SYSTEM
Filed Sept. 2, 1950 — 13 Sheets-Sheet 12

WITNESSES:
INVENTOR
William F. Eames.
BY
ATTORNEY

June 16, 1953  W. F. EAMES  2,642,158
SELECTIVELY ZONED ELEVATOR SYSTEM
Filed Sept. 2, 1950  13 Sheets-Sheet 13

Fig. IB.

WITNESSES:

INVENTOR
William F. Eames.
BY
ATTORNEY

Patented June 16, 1953

2,642,158

UNITED STATES PATENT OFFICE 2,642,158

SELECTIVELY ZONED ELEVATOR SYSTEM

William F. Eames, Westfield, N. J., assignor to Westinghouse Electric Corporation, East Pittsburgh, Pa., a corporation of Pennsylvania Application September 2, 1950, Serial No. 183,007

77 Claims. (Cl. 187—29)

This invention relates to selectively zoned elevator systems, and it has particular relation to an elevator system wherein the system is divided into zones in response to a predetermined traffic condition.

The prior art for some time has recognized the variable nature of the traffic service demand encountered by many elevator installations. As examples of the types of traffic service demand which may be encountered, a system having an upper terminal landing or floor and a lower terminal landing or floor may encounter a traffic service demand which is predominantly from the various lower floors towards the upper terminal floor or which is from the various upper floors towards the lower terminal landing. Further examples of the traffic service demand may be predominantly from one of the terminal landings towards the remaining landings or floors of the system. The invention is particularly concerned with a traffic service demand which is predominantly towards one of the terminal floors and will be described in connection with such a service demand.

The desirability of zoning an elevator system in order to provide efficient service for a traffic service demand predominantly toward one of the terminal floors is clearly set forth in the Bouton et al. Patent No. 2,376,113; the Williams et al. Patent No. 2,376,218; and the Santini Patent No. 2,492,010.

In accordance with the invention, an improved elevator system is provided for handling traffic conditions wherein the traffic service demand predominantly is towards one of the terminal floors. Although the system may be employed for traffic service demands predominantly for either the upper or the lower terminal floor, the problem more frequently occurs for the lower terminal floor, and the invention will be discussed primarily for a traffic service demand predominantly towards the lower terminal floor. According to the invention, a plurality of elevator cars are disposed for operation between upper and lower terminal floors. These elevator cars operate in a bank wherein each of the elevator cars gives similar service for the various floors of the building in which the elevator system is installed. The elevator cars may be operated on through trips between the terminal floors. At each of the terminal floors, the elevator cars may be dispatched in accordance with any desired plan.

Preferably, however, the elevator cars are dispatched only from the lower terminal floor. Inasmuch as the demand for up service is small during periods wherein the traffic service demand predominantly is in a down direction, the elevator cars may be dispatched from the lower terminal floor immediately after arrival thereat. If desired, one elevator car may be held for a short time at the lower terminal floor for the purpose of receiving passengers desiring to proceed to an upper floor.

In a preferred embodiment of the invention, each of the elevator cars in its upward travel proceeds to the highest call for service and reverses at the highest call to return to the lower terminal landing. Such operation is commonly referred to in the art as "high-call reversal operation."

When a predetermined traffic condition is encountered, the elevator system embodying the invention is converted into a zoned system. The conversion may be manually effected, but preferably it is automatically effected in response to the predetermined traffic condition. The number of zones depends on the requirements of each installation. Although more than two zones may be employed the invention may be described adequately for a two-zone system.

The predetermined traffic condition which converts the system to a zoned system may be selected in accordance with the requirements of each elevator installation. For example, the predetermined traffic condition may be based on the number of calls for service, such as down calls, which have been registered at the various floors of the building served by the elevator cars. Thus, when the number of down calls for service exceeds a predetermined number (termed a "heavy down-traffic condition"), the system automatically may be converted to a zoned system.

Alternatively, the predetermined traffic condition may include other factors, such as the time during which registered calls for service remain unanswered. If desired, the predetermined traffic condition may be a function both of the number of registered calls for service, such as down calls, and the time during which such calls remain unanswered.

In the zoned elevator system, the floors or landings are divided into a plurality of zones. The number of landings or floors placed in each of the zones may be selected to maintain substantially a predetermined relationship or balance between the calls for service from the individual zones. The selection of the floors to be placed in each of the zones may be a manual selection by the elevator starter or some other attendant, but preferably the selection is an automatic selection responsive to the calls registered. Thus, in a two-zone system having a high zone and a low zone, the number of landings placed in each of the zones may be selected to provide a substantially equal number of registered calls for service from the zones. If the number of calls for service cannot be divided equally between the zones, the odd call for service may be assigned to one of the zones, preferably the low zone. Inasmuch as the calls for service from the zones are substantially continuously balanced, the dividing plane between the zones may shift frequently during the operation of the system.

In addition, the available elevator cars are divided between the zones. The particular zone to which an available elevator car is assigned depends on the balance which is maintained between the calls for service from the zones. Thus, if the balance which is maintained places most of the calls for service in the low zone, a proportionately large percentage of the available elevator cars may be assigned to the low zone. Assuming that the calls for service are substantially evenly divided between a high zone and a low zone, the available elevator cars also may be substantially evenly divided between the two zones. If the elevator cars cannot be evenly divided, the odd car may be assigned to the high zone because of the longer travel required for the high-zone cars.

In order to maintain a reasonable balance between the elevator cars assigned to each of the zones, the elevator cars assigned to each of the zones may be substantially continuously counted. In the case of a two-zone system, it is satisfactory to count any elevator car in the high zone as a high-zone car whether the car is set for up travel or down travel. With respect to the low zone, it is satisfactory to count only cars set for down travel in the low zone as low-zone cars. When a high-zone elevator car enters the low zone during its down travel, it is satisfactory to consider that the elevator car no longer is a high-zone car but has become a low-zone car. If a low-zone car becomes full, the car attendant may operate his by-pass to prevent the car from stopping in response to calls for service from floors ahead of the elevator car. If the by-pass is operated in a low-zone car during its down travel, it is satisfactory to cancel the low zone assignment of the elevator car, and this car no longer would be counted as a low-zone car. Furthermore, the assignment of an elevator car to the low zone conveniently may be cancelled when the elevator car arrives at the lower terminal floor.

The conditions under which an elevator car is "available" for assignment to one of the zones may be predetermined. For example, an elevator car may be considered as available for assignment if it is located in the low zone and if it is set for up travel. Preferably, it is not available for assignment as long as a car call is registered for a floor above the position of the car.

When the elevator system is conditioned for zone operation, it may be desirable to favor certain calls for service. For example, when the demand for service predominantly is towards the lower terminal floor, the demand for up service usually is small. Under these circumstances, service may be improved if each available car is prevented from answering registered up calls from the floors unless a car call has been registered in such car. This means that an intending passenger desiring up service from an intermediate floor must await an available car having a car call registered therein for a higher floor or must await a return of the elevator system to a condition wherein the demand for service is lighter than the predetermined traffic condition necessary for zoned operation. The favoring of certain calls such as down calls may be terminated as soon as a predetermined balance of cars between the zones is achieved. Because of the light demand for up service which generally is encountered when the elevator system is conditioned for zoned operation, adequate service usually is provided for all prospective passengers. However, if additional service for registered up calls is desired, it is possible to assign certain of the elevator cars to answer such registered up calls. Alternatively, certain of the elevator cars may be assigned to answer up calls under predetermined conditions, such as a condition wherein the number of up calls exceeds a predetermined number or a condition wherein one or more of the up calls have remained unanswered for an unreasonably long time.

If an elevator car is assigned to the low zone, such elevator car preferably reverses at the highest down call which has been registered in the low zone. If the elevator car enters the high zone, preferably it reverses at the highest call for service from the high zone.

It should be noted that the invention provides a dynamic load-sensitive system wherein a dividing plane between zones may shift frequently. The shift of the dividing plane may place a low-zone car in the high zone or a high-zone car in the low zone. It may be desirable to prevent a false stop of an elevator car as a result of such a shift of the dividing plane.

It is, therefore, an object of the invention to provide an improved elevator system which in response to a predetermined service demand is divided into a plurality of zones.

It is a further object of the invention to provide a zoned elevator system wherein the dividing plane between the zones shifts in accordance with a desired plan.

It is also an object of the invention to provide a zoned elevator system wherein the number of landings in each of the zones is selected to maintain substantially a predetermined balance between the calls for service from each of the zones.

It is an additional object of the invention to provide a zoned elevator system wherein elevator cars are assigned to the zones as such elevator cars become available.

It is a still further object of the invention to provide an elevator system as defined in the preceding paragraph wherein the elevator cars are assigned to maintain substantially a predetermined balance between the elevator cars assigned to the individual zones.

It is another object of the invention to provide an elevator system wherein the landings served by the elevator cars are divided into zones and wherein an elevator car assigned to one of the zones remains so assigned until it reaches a predetermined terminal floor of the zone.

It is still another object of the invention to provide a zoned elevator system wherein an elevator car assigned to one of the zones has its assignment cancelled in response to the by-passing by the elevator car of a call for service.

It is also an object of the invention to provide an elevator system embodying any combination of the foregoing objects.

Other objects of the invention will be apparent from the following description taken in conjunction with the accompanying drawings in which:

Figures 1 and 1A are placed in horizontal alignment, it will be found that corresponding contacts and coils of the relays and switches in the two figures are substantially in horizontal alignment.

Figure 1B is a view in elevation with parts broken of an elevator car and drive mechanism which may be employed in the system of Figure 1.

Figures 3 and 3A are placed in horizontal alignment, it will be found that the various corresponding coils and contacts of the two figures are substantially in horizontal alignment.

Figures 4 and 4A are placed in horizontal alignment, it will be found that the corresponding contacts and coils thereof are substantially in horizontal alignment.

Figures 6 and 6A are placed in horizontal alignment, it will be found that corresponding coils and contacts thereof are substantially in horizontal alignment.

Figure 6:
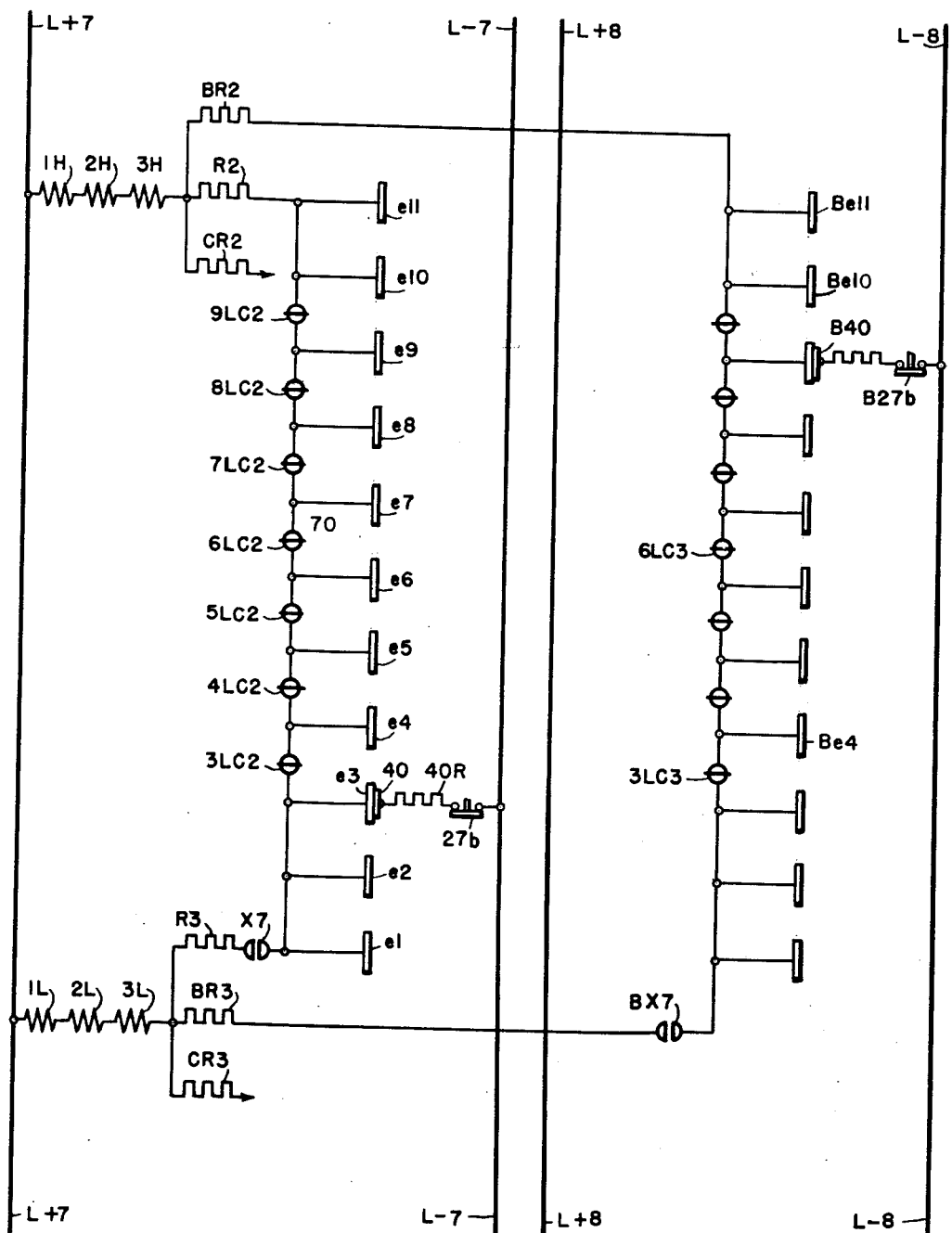
Figure 6 is a schematic view in straight line form of an additional portion of the elevator system embodying the invention.
Figure 6A:
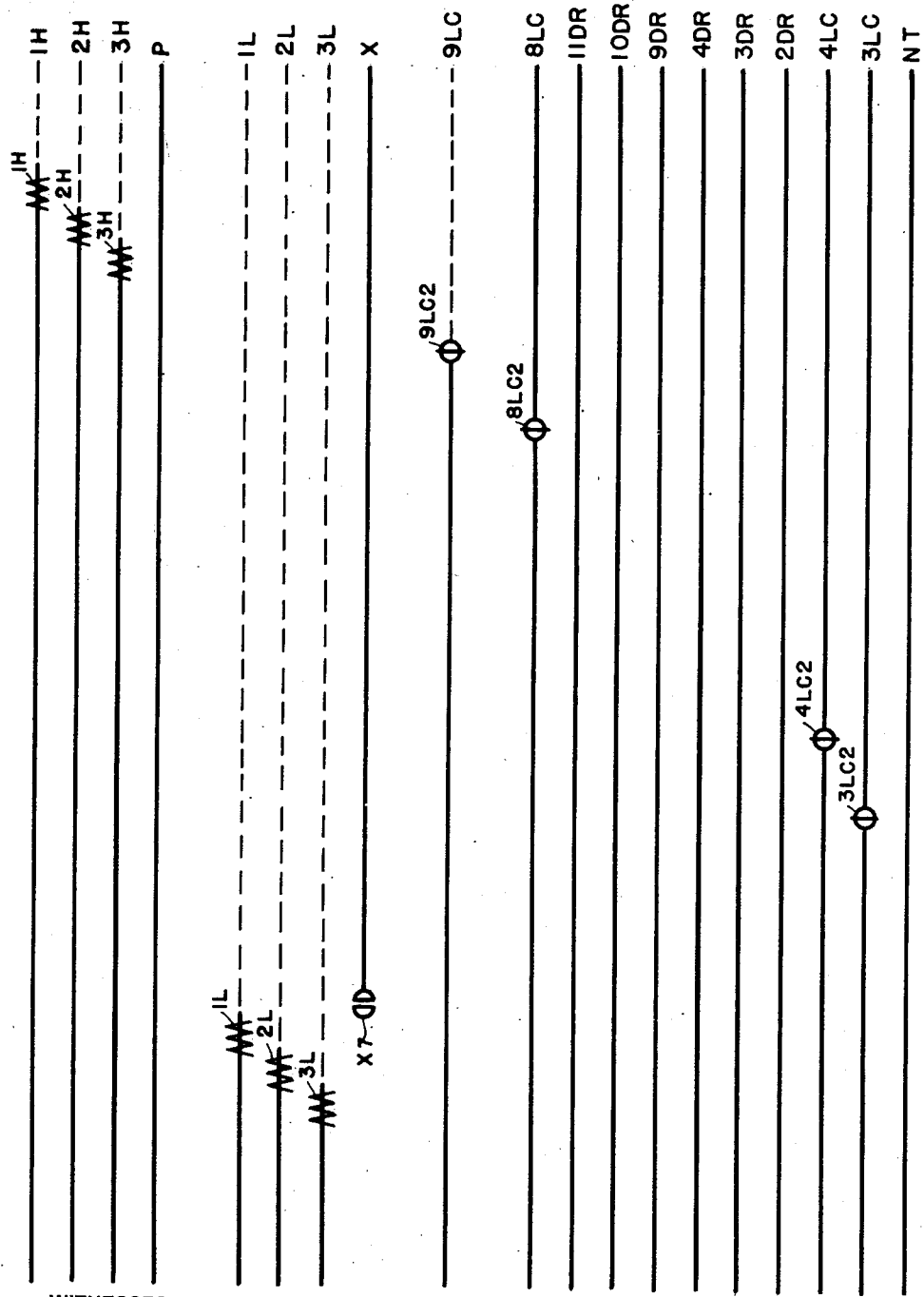
Figure 6A is a schematic view of relays and switches employed in the elevator system. If
Figure 7A:
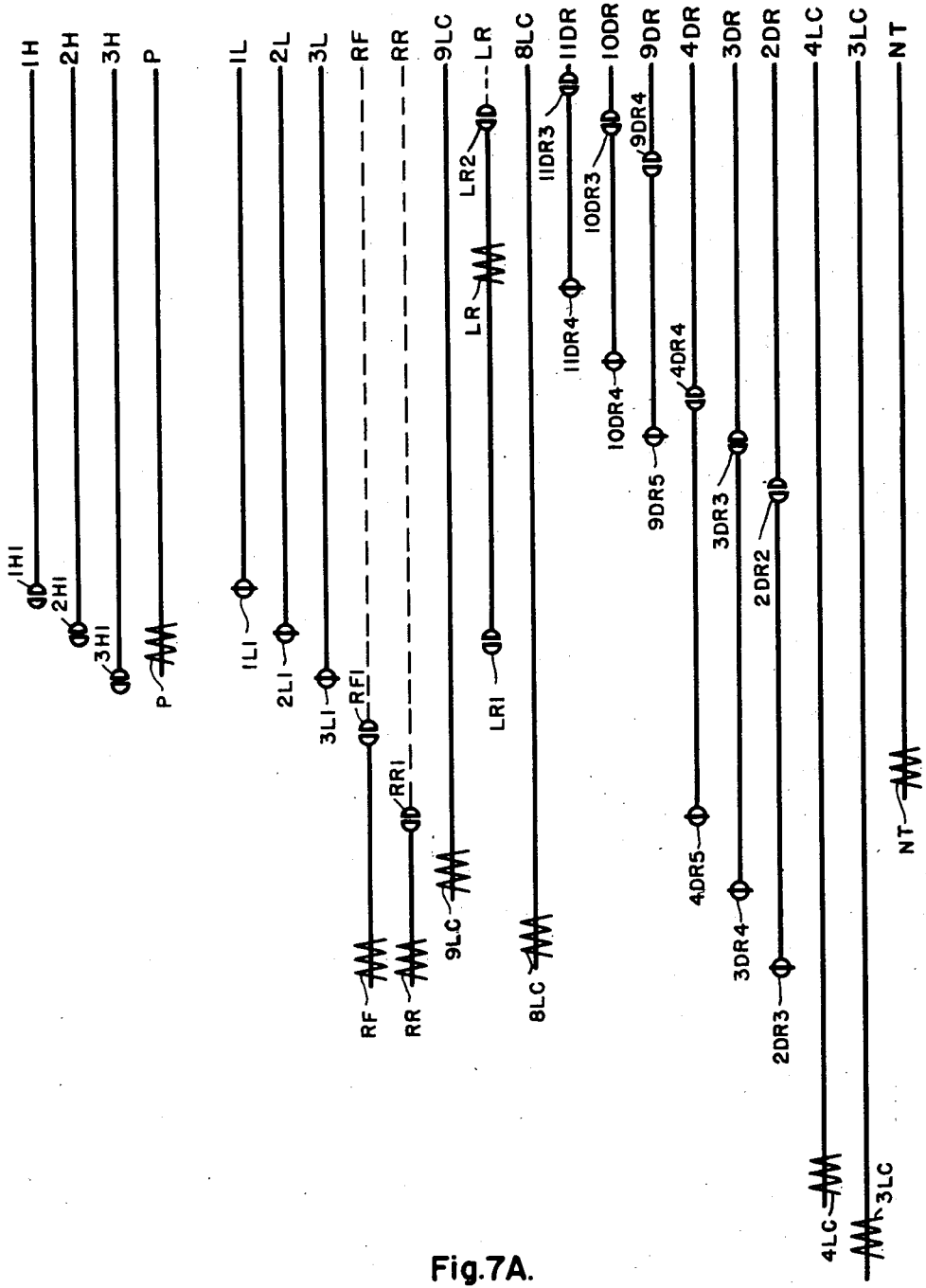
Figure 7 is a schematic view showing a further portion of the elevator system embodying the invention in straight line form.
Figure 7B is a schematic view in straight line form showing a still further portion of the elevator system embodying the invention.
Figure 8:
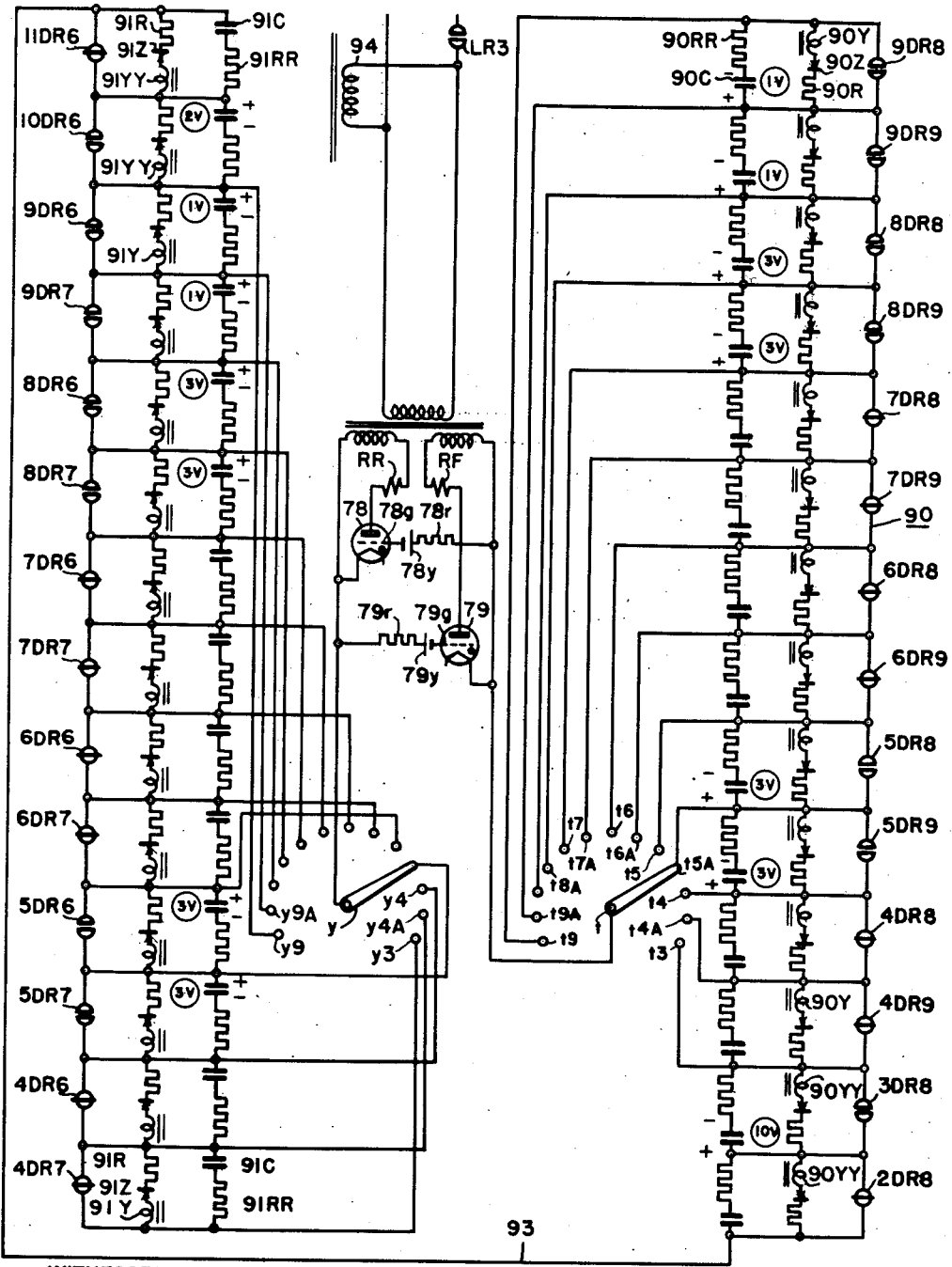

Figure 7A is a schematic view of relays and switches employed in the elevator system. If Figures 7 and 7B are placed in horizontal alignment with Figure 7A, it will be found that contacts and coils of the figures are substantially in horizontal alignment; and Figure 8 is a schematic view showing a modified system for dividing the floors of an elevator system into zones, and the modified system is suitable for incorporation in the system illustrated in Figures 1 to 7, inclusive, of the drawings.

Figure 8A:
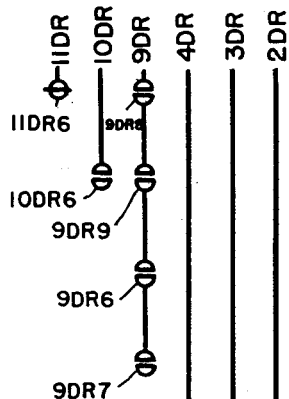
Figure 8A:
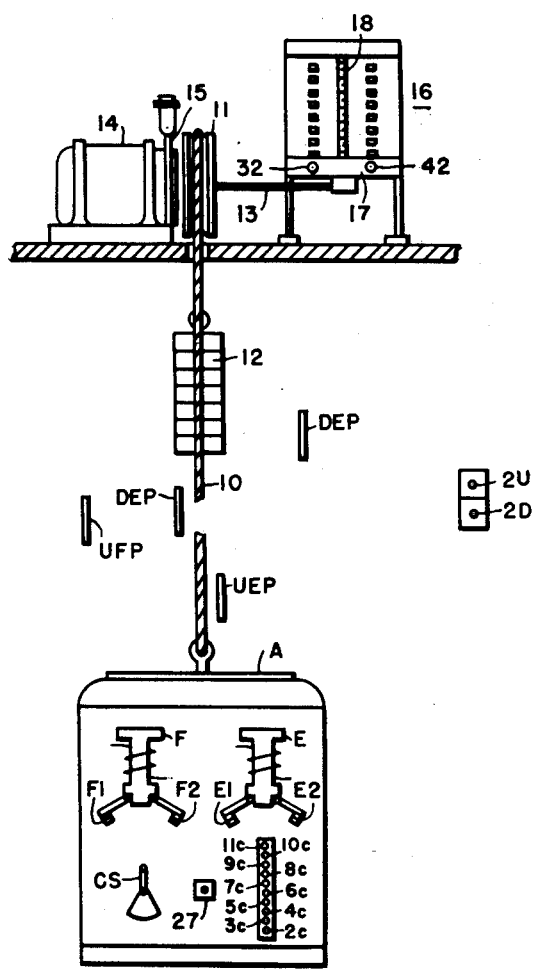
Figure 8A:
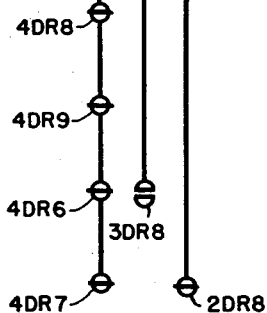

Figure 8A is a schematic view of relays and switches employed in the elevator system. If Figures 8 and 8A are placed in horizontal alignment corresponding contacts of the two figures will be substantially in horizontal alignment.

The invention may be employed for various numbers of elevator cars and for structures having various numbers of landings or floors served by the elevator cars. The invention can divide the floors into any desired number of zones and can divide the available elevator cars among the zones to provide efficient service. It is believed, however, that the invention can be described adequately by reference primarily to two elevator cars, A and B, serving a building having eleven landings or floors which can be divided into two zones. The first floor constitutes a lower terminal floor, whereas the eleventh floor constitutes an upper terminal floor.

Inasmuch as similar equipment is employed for each of the cars, the invention will be described primarily with respect to the car A. Similar reference characters are employed for similar components of the car B except that the reference characters are preceded by the identifying letter "B."

Unless otherwise stated, switches and relays are illustrated in their deenergized conditions. Each set of contacts is identified by a separate suffix, which is attached to the reference character or the relay or switch of which the contacts are a part. To illustrate the conventions here employed, the reference character U5 identifies the fifth set of contacts of the up-direction switch U which is employed for the car A. As a further example, the reference character BU3 represents the third set of contacts of the corresponding up-direction switch for the elevator car B. The contacts may be make or front contacts which close to complete a circuit when the relay or switch of which the contacts form a part is energized. Alternatively, the contacts may be back or break contacts which open to interrupt an electrical circuit when the relay or switch of which the contacts form a part is energized. The reference characters L+ or L− followed by a numeral designate the positive or negative bus of a direct current source of electrical energy.

*Apparatus individual to car A*

D—down-direction switch
E—slow-down inductor relay
F—stopping inductor relay
G—inductor holding relay
H—high-car-call relay
J—high-call reversing relay
K—high-floor-call relay
M—car-running relay
S—floor-call stopping relay
T—car-call stopping relay
U—up-direction switch
V—high-speed relay
W—up-direction preference relay
X—down-direction preference relay
DR—door relay

*Apparatus common to both cars*

2DR to 11DR—down-call-storing relays
2UR to 11UR—up-call-storing relays
1H, 2H, 3H—high-zone, car-counting relays
1L, 2L, 3L—low-zone, car-counting relays
L—low-zone, high-floor-call relay
LR—quota relay
P—car-balance relay
3LC to 9LS—auxiliary zoning relays
NT—zone-shift-responsive relay

*Apparatus in Fig. 1B*

Figure 1:
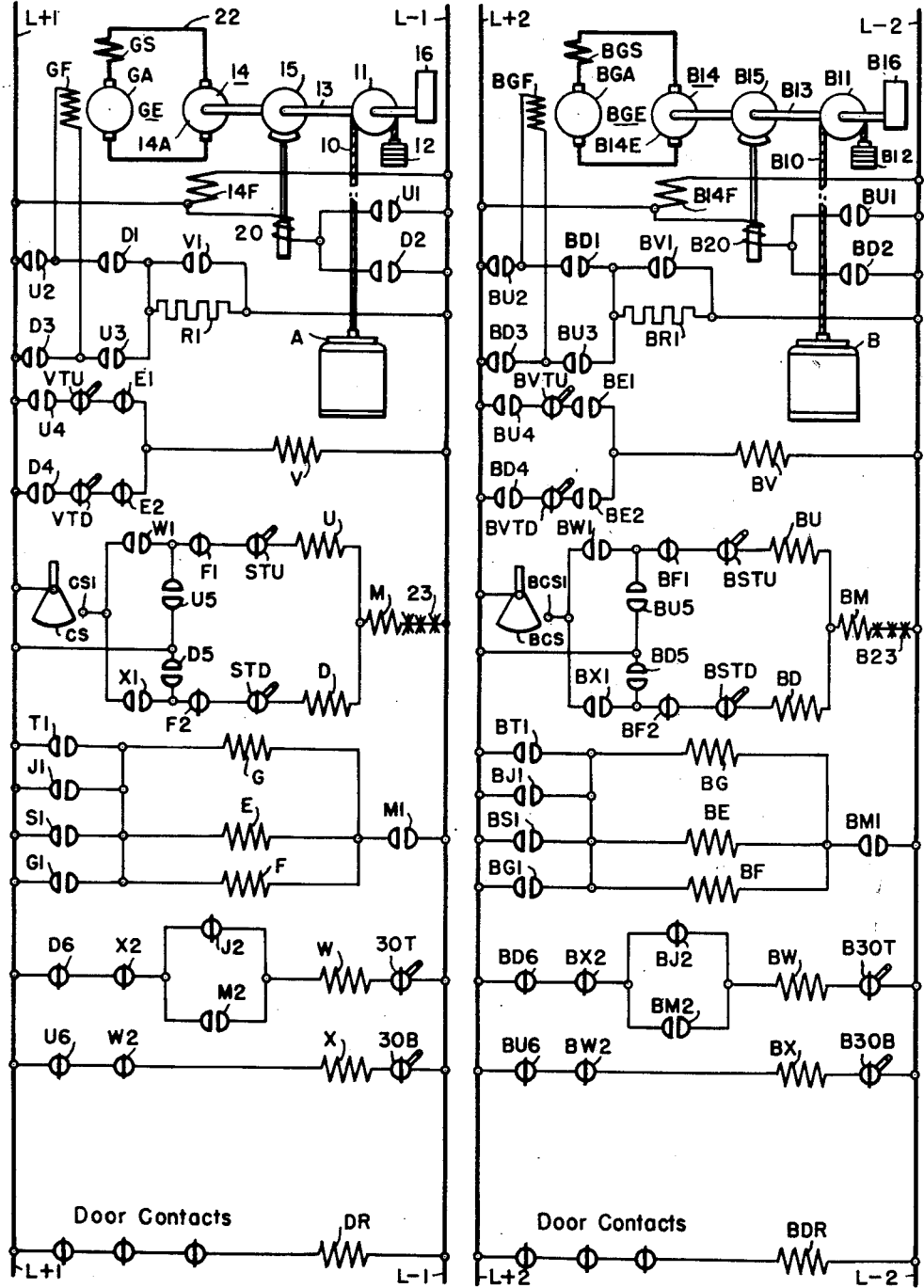
Figure 1 is a schematic view with parts in straight line form and with parts shown in elevation of a portion of an elevator system embodying the invention.
Figure 1A:
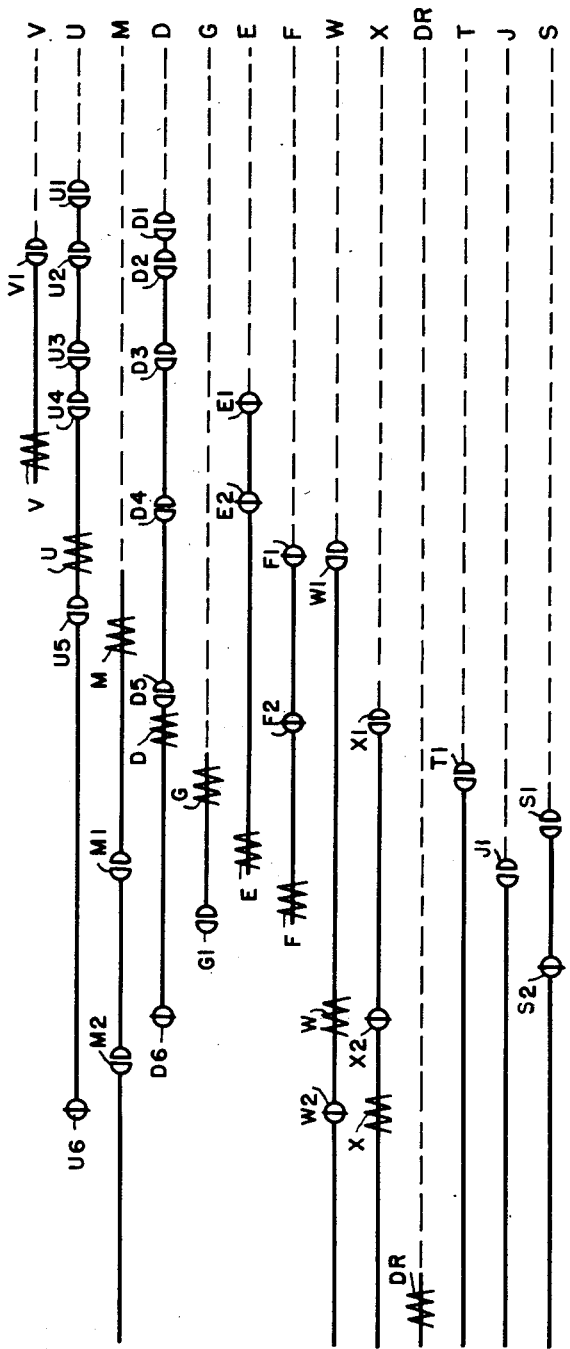
Figure 1A is a schematic view of relays and switches employed in Figure 1. If

Referring more particularly to Figure 1 of the drawings, it will be observed that the car A is arranged to be supported in a hatchway by a cable 10 which passes over a sheave 11 to a counterweight 12. The sheave 11 is mounted for rotation by a shaft 13 driven by a motor 14. A brake 15 of the usual spring-operated, electromagnetically-released type is provided for stopping further rotation of the sheave 11 when the motor 14 is deenergized.

A floor selector 16 of any suitable type is provided for connecting the various electrical circuits of the system in accordance with the position of car A. The shaft 13 is extended to operate a brush carriage 17 on the floor selector 16 by mechanically rotating a screw-threaded shaft 18 on which the carriage is mounted. The carriage 17 is provided with a number of brushes, which are disposed upon movement of the car to successively engage stationary contacts arranged in rows on the selector in position to correspond to the floors of the building.

A starting switch CS is mounted in the car to be operated by the attendant to start the car. When the car switch is rotated anticlockwise, it closes its contacts to start the car for the direction for which it is conditioned to operate. When the car switch is centered, it leaves the control system of the car in such condition that the car can be stopped by operation of hall buttons at the floor landings or stop buttons in the car. It is to be understood that the car may be operated by the car switch or that any suitable control means may be substituted for the car switch. The illustration of the car switch is used for simplicity in describing the system.

Car buttons 2c to 11c (one for each floor) are mounted in the car, so that the attendant may by operating them cause the car to stop automatically at any floor. The direction of operation of the car is controlled by relays W and X as will be described below.

The hall buttons are mounted at the floor landings in order that waiting passengers may cause the cars to stop thereat. An up button and a down button are provided at each floor intermediate the terminals. A down button is disposed at the top terminal, and an up button at the bottom terminal. Figure 1B illustrates only the up-hall-call button 2U and the down-hall call 2D for the second floor.

In order to automatically effect accurate stopping of car A at the floors in response to operation of the stopping buttons 2c, etc., in the car, or by operation of the hall call buttons 2U, 2D, etc., at the floors, a slow-down inductor relay E and a stopping inductor relay F are mounted on the car in position to cooperate with suitable inductor plates of iron or other magnetic material mounted in the hatchway adjacent to each floor. Only the up plates UEP and UFP and the down plates DEP and DFP for the second floor are illustrated. Similar plates are provided for each floor, except that the top terminal has only up plates, and the bottom terminal only down plates.

The inductor relays E and F when their coils are energized have normally incomplete magnetic circuits, which are successively completed by the inductor plates as the car approaches a floor at which a stop is to be made. These relays are so designed that energization of their operating coils will not produce operation of their contacts until the relay is brought opposite its inductor plate, thereby completing the relay magnetic circuit. Upon operation of the relay contacts (such as E1 or E2), they remain in operated condition until the relay-operating coil is deenergized, even though the inductor relay moves away from the position opposite the inductor plate which completed its magnetic circuit. The plates should be so spaced in the hatchway as to provide desirable distances for slowdown and stopping of the cars at the floors. Other methods of controlling slowing down and stopping of the car may be used if so desired.

The cars and their control apparatus are provided for operation under normal conditions as a high-call-reversal system in which the cars stop for up calls on their up trips but automatically stop and reverse at the highest down call when there is no service required above that highest down call. If the car attendant desires for any reason to go above the highest down call while on an up trip, he can do so by pressing a car-call button 2c, etc., for a floor above to cause the car to keep on up to such floor. However, at certain peak periods in down travel, the system is adjusted or set to cause selected cars to serve down calls in the lower floors.

A push-button switch 27 is provided in car A to permit the attendant to by-pass the calls ahead of his car when it is loaded or whenever the attendant desires to operate the car straight through. When switch 27 is pressed to by-pass calls, it opens its contacts 27a (Figure 3) to prevent the car from answering calls. Apparatus similar to that shown in Fig. 1B is provided for each of the cars.

*Apparatus in Fig. 1*

Fig. 1 shows control circuits for two cars A and B. Control circuits on the left-hand side are individual to the car A. Control circuits on the right-hand side are individual to the car B.

As shown, the motor 14 is provided with an armature 14A which is mechanically connected to the shaft 13 for driving the sheave 11. The brake 15 is provided with a winding 20 which is energized on energization of the motor 14. The motor 14 includes the usual shunt-type main field winding 14F, which is connected for energization across the direct-current supply conductors L+1 and L—1. The armature 14A is connected for energization by a loop circuit 22 to a generator GE, which is provided with an armature GA. The armature GA is rotated at a constant rate by suitable driving mechanism (not shown).

In order to control the direction and magnitude of the voltage generated by the generator armature GA, a separately-excited main field winding GF is provided for the generator GE. A field resistor R1 is included in the circuit of the field winding GF to provide speed control for the motor 14. The generator GE is provided with suitable means such as series field winding GS for correcting the speed regulation of motor 14.

The master switch CS located in car A is here shown connected to control the energization of the operating windings of an up direction switch U and a down direction switch D. The direction switches U and D are provided with contact members for connecting the generator field winding GF to the conductors L—1 and L+1 in accordance with the direction in which it is desired to operate the car. When either the up or the down direction switch U or D is energized, the car-running relay M is also energized to condition certain circuits for operation. The common circuit of the direction switches U and D, and the running relay M includes the usual safety devices indicated diagrammatically at 23.

A high-speed relay V is provided for short circuiting the resistor R1 disposed in series circuit relation with the generator field winding GF for applying the maximum voltage to that winding when the car is operating at normal high speed.

This relay is controlled by the switches U and D on starting and by the slow-down inductor relay E when stopping.

An upper and a lower mechanical limit switch VTU and VTD are provided for interrupting the circuit of the high-speed relay V when the car reaches a proper slow-down point in advance of the upper and lower terminals, respectively, and an upper and a lower stopping limit switch STU and STD are provided for opening the circuits of the direction switches U and D at the terminal limits in accordance with the usual practice.

An up-direction preference relay W and a down-direction preference relay X are provided for controlling the direction of operation of the car and performing certain functions in connection therewith. The operating windings of these relays are controlled by a top limit switch 30T, a bottom limit switch 30B and the high-call-reversal relay. Each of the limit switches 30T and 30B is arranged to be opened when car A arrives at the corresponding terminal, thereby interrupting the circuit of the direction preference relay W or X corresponding to the direction of operation of the car. Also, when the high-call-reversal relay operates while the car is between terminals, the relays W and X are operated to reverse the direction switches. Hence, the car attendant does not need to do anything except close or open the car switch CS and operate the car-call buttons.

Figure 3:
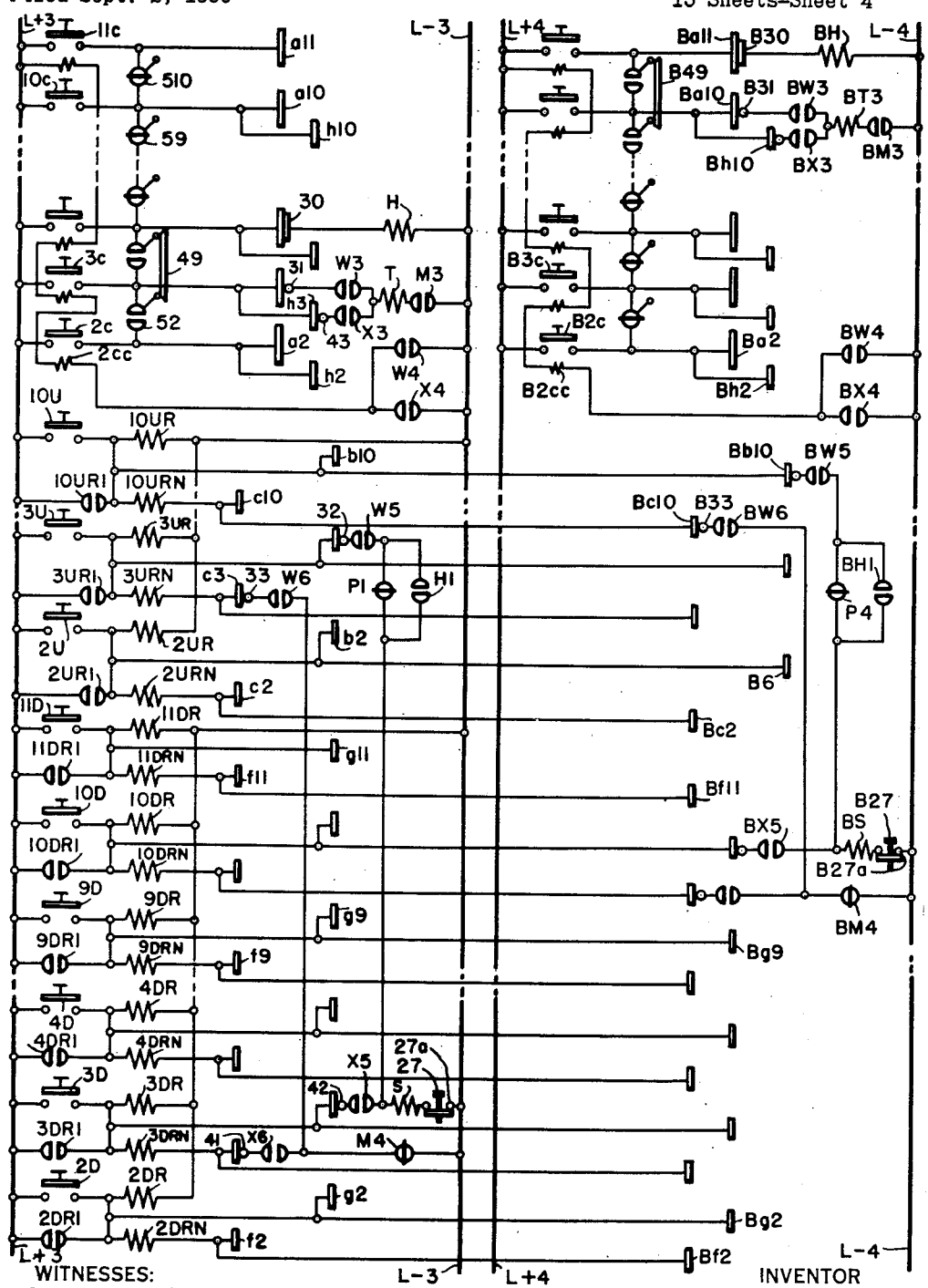
Figure 3 is a schematic view showing a further portion in straight line form of the elevator system embodying the invention.
Figure 3A:
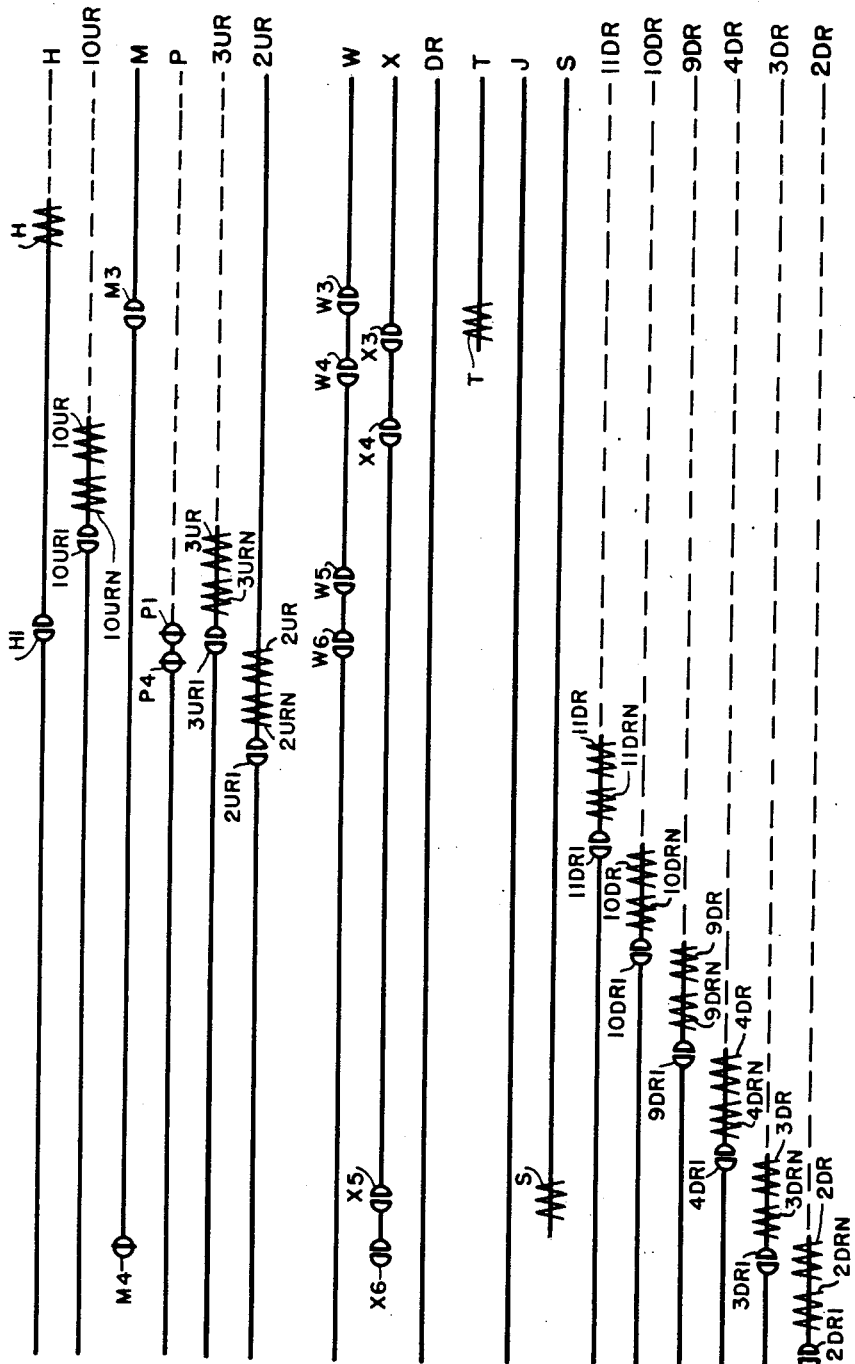
Figure 3A is a schematic view of relays and switches employed in the elevator system. If
Figure 4:
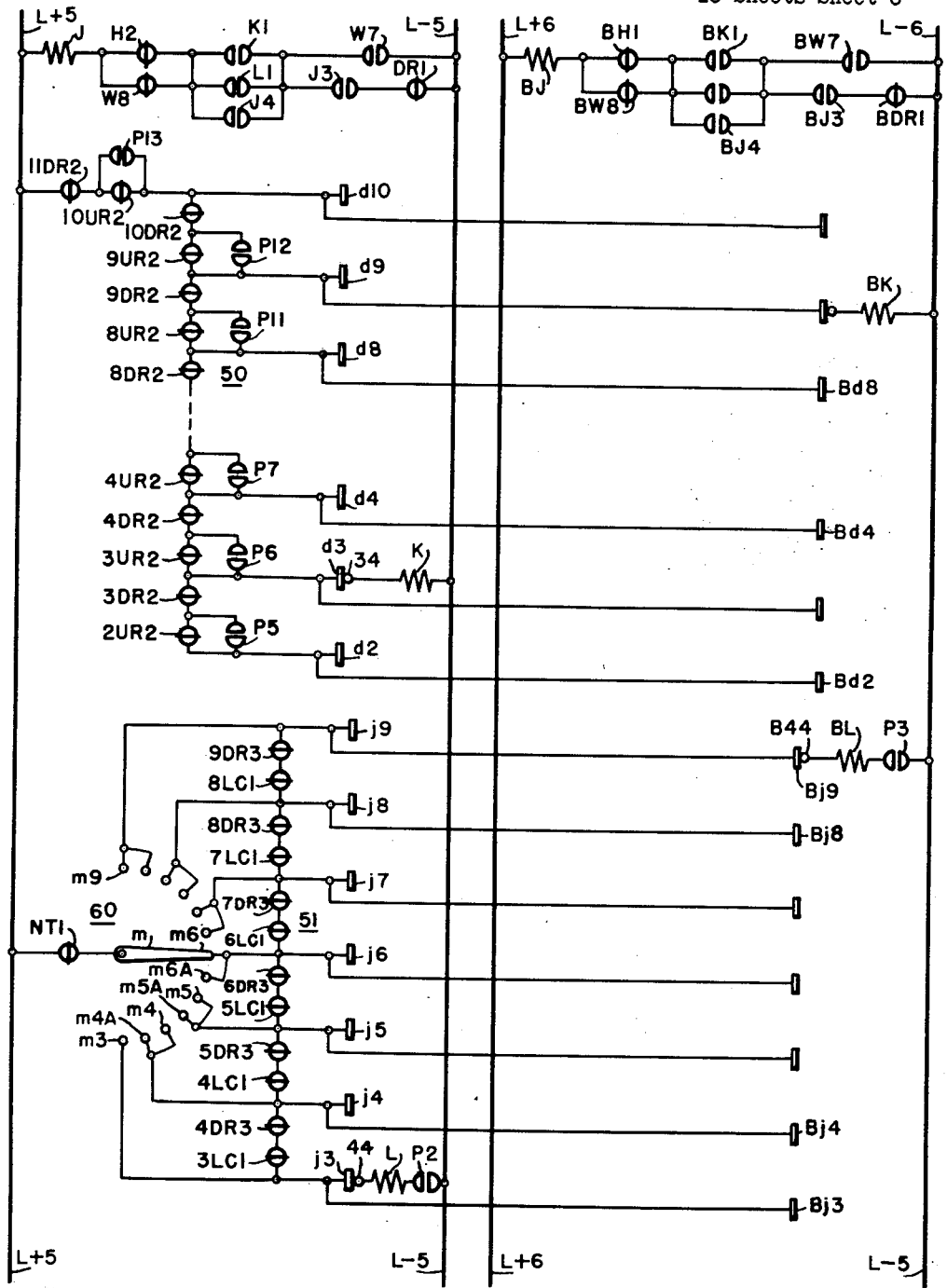
Figure 4 is a schematic view showing a still further portion of the elevator system embodying the invention in straight line form.
Figure 4A:
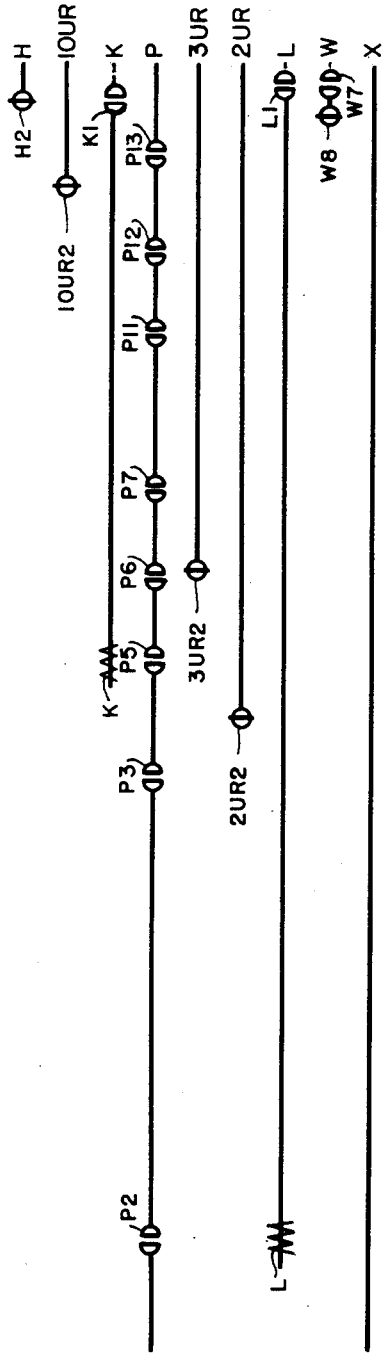
Figure 4A is a schematic view of the relays employed in the system. If
Figure 4A:
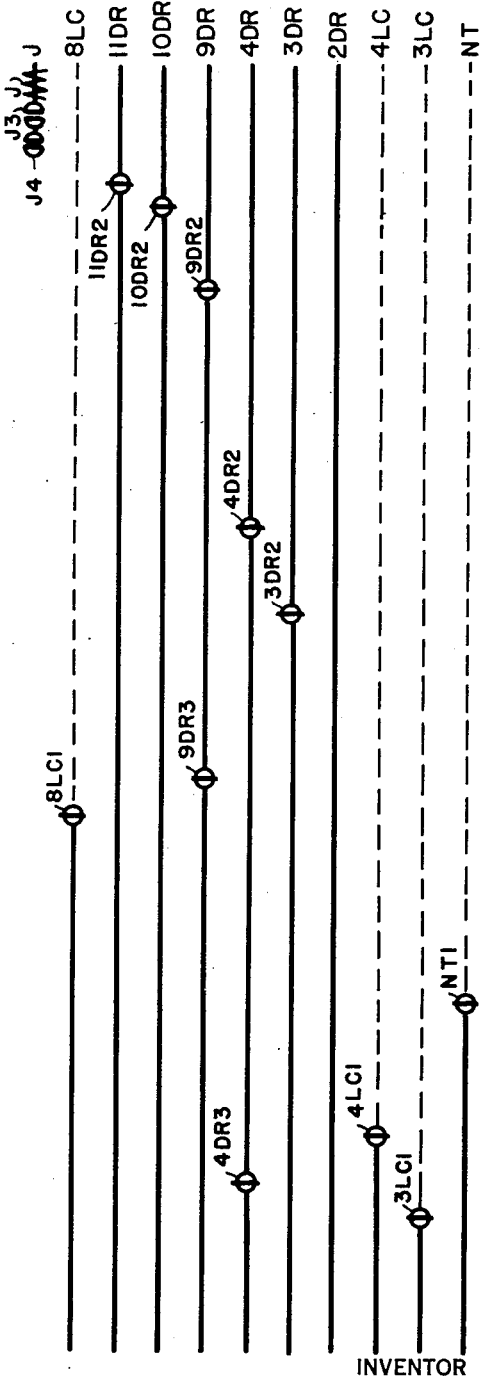

The energizing coils for the slow-down inductor switch E and the stopping inductor switch F are illustrated in this figure as arranged to be energized on operation of the contacts S1 of a floor-call stopping relay S, the contacts T1 of a car-call stopping relay T or the contacts J1 of a high-call reversing relay J. (The operating coils for relays S and T are illustrated in Figure 3, and the coil for relay J is illustrated in Figure 4 and will be described in connection therewith.)

An inductor holding relay G is provided for maintaining the inductor relays in energized condition during a decelerating or stopping operation.

A door relay DR is illustrated as controlled by a plurality of door safety contacts. The relay DR may be used for various safety circuits, and it is also used for assisting in the control of the high-call reversing relay J shown in Figure 4.

Figure 2:
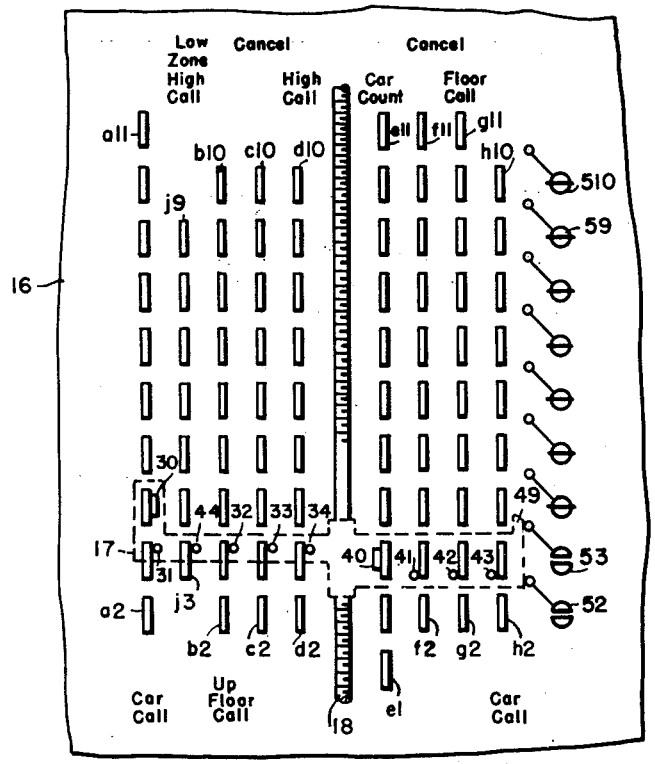
Figure 2 is a view in elevation of a portion of a selector suitable for the system of Figure 1.

*Apparatus in Fig. 2*

Figure 2 illustrates an enlarged view of the floor selector 16 of Figure 1. In this figure, the various stationary contact segments are represented by rectangles and most of the contacting brushes by small circles. The brush carriage 17 is shown by dotted lines in the position it occupies when the associated car is stopped at the third floor.

The contact segments $a2$ to $a11$ on the floor selector are disposed to be successively engaged by the brush 30 to control the high-car-call relay H and by the brush 31 for completing stop circuits set up by the call push buttons in the car for up-direction stops. The brush 30 should be long enough to bridge adjacent contact segments.

The contact segments $b2$ to $b10$ and the brush 32 are for connecting the circuits of the stop buttons 2U, etc., at the floor landings for up stops. The up contact segments $c2$ to $c10$ and the brush 33 are provided for connecting circuits for cancelling stop calls registered by the up-hall-call buttons 2U, etc. The up contact segments $d1$ to $d11$ and the brush 34 connect circuits for the high-call relay to be described later. The contact segments $e1$ to $e11$ and the brush 40 connect circuits for car-counting relays to be described later. The down-cancel contact segments $f2$, etc., and brush 41; the down-floor-call contact segments $g2$, etc., and brush 42; and the down-car-call contact segments $h2$, etc., and brush 43 are provided for connecting circuits for the down direction in the same manner as described for the up direction. The contact segments $j3$ to $j9$ and the brush 44 control circuits for the low-zone, high-floor-call relay L.

On the right-hand side of the floor selector, a series of switches 52 to 510 are illustrated as disposed to be operated by a cam 49 on the carriage 17 as it moves from its floor-to-floor position for the purpose of controlling a high-car-call circuit. The cam 49 is long enough to operate a switch before releasing a preceding switch.

*Apparatus in Fig. 3*

The car buttons 2c, etc., described in connection with Figure 1B are illustrated with their holding coils 2cc, etc., and circuits in the upper part of Figure 3 in connection with the high-car-call relay H and the stopping relay T. The coils 2cc, etc., are energized when the car starts in either direction to hold in the car buttons 2c, 3c, etc., as they are operated until the direction of the car is reversed so that the temporary operation of a car button by the attendant will cause it to remain in operated condition until the car is reversed.

The high-car-call relay H is used to prevent relay J (Figure 4) from reversing the car at the highest registered floor call when a stop call for a floor above is registered on the stop buttons in the car. It is connected by brush 30 to the row of contact segments $a2$, etc., on the floor selector 16 so that it will be energized whenever a stop call is registered on one of the stop buttons in car A for a floor above the car. The switches 52 to 510, inclusive, operated by the cam 49, are shown as disposed in the circuits of the car buttons to prevent energization of the relay H by operated stop buttons in car A for floors below that car.

The car-stopping relay T is connected to the up brush 31 engaging the row of contact segments $a2$, etc., and to the down brush 43 engaging the row of contact segments $h2$, etc., so that when a call is registered on a car button and the car approaches the energized contact segment corresponding thereto, relay T will be energized to stop the car by energizing the inductor relays F and E.

The floor buttons 2U, 2D, etc., described in connection with Figure 1B are shown with their circuits in the lower part of Figure 3. Associated with each floor button is a call-registering or storing relay by means of which the momentary pressing of the button will set up or register a stop call which will hold itself until it is answered by the stopping of a car at that floor for the direction of the registered call. The call-registering relays are designed as 2DR to 11DR for the down direction and as 2UR to 10UR for the up direction. For simplicity, the up-direction registering relays and floor buttons for only the second, third, and tenth floors and the down-direction registering relays and floor buttons for only the second, third, fourth, ninth, tenth, and eleventh floors are shown as the buttons and registering relays for the other floors will be readily understood.

The down-call registering relays when energized close circuits to the row of contact segments g2, etc., and the up registering relays when energized close circuits to the row of contact segments b2, etc., on the floor selector so that the contact segment for a floor for which a call is registered is energized as long as the call exists.

A car-stopping relay S is shown as connected to the up brush 32 engaging segments b2, etc., and the down brush 42 engaging segments g2, etc. When the car approaches a floor in a direction for which a call is registered, the corresponding brush engages the energized contact segment for that floor and that direction and thereby causes the relay S to be energized, which, in turn, energizes the inductor relays F and E of that car to effect the stopping of that car at that floor.

A cancellation coil is wound in opposition to each call-registering coil and connected to the cancellation contact segments on the floor selector. The up cancellation coils are designed as 2URN, etc., connected to the up segments c2, etc., and the down cancellation coils as 2DRN, etc., connected to the down segments f2, etc. As the brush 33 moves over the segments c2, etc., and the brush 41 moves over the segments f2, etc., they energize the cancellation coil for any floor at which the bar stops to answer a stop call.

*Apparatus in Fig. 4*

Figure 4 illustrates the high-call reversing relay J, the high-floor-call relay K, and the low-zone, high-floor-call relay L.

The high-call reversing relay J controls the reversal of the elevator car A at an intermediate floor. For this relay to be energized, the break contacts H2 of the high-car-call relay must be closed to indicate that no car call exists for a floor above the position of the car A. In addition, one of the sets of contacts K1 or L1 must be closed. Closure of the make contacts K1 indicates that the high-floor-call relay K is energized and that no floor call exists for a floor above the position of the elevator car A. If the make contacts L1 are closed, the low-zone, high-floor-call relay must be energized to indicate that no floor call exists for a floor in the low zone above the position of the elevator car. Finally, the make contacts W7 must be closed as will occur when the elevator car is set for up travel.

Upon energization the relay J closes its front contacts J1 (Fig. 1) to prepare the elevator car for a stopping operation, opens its break contacts J2 to prepare the elevator car A for reversal, and closes the make contacts J3 and J4 (Fig. 4) to establish self-holding circuits. Inasmuch as the doors start to open before the car reaches a floor at which it is to reverse, the break contacts DR1 of the door relay close before the contacts W7 of the up preference relay open to complete the holding circuit for the relay J. When the elevator doors are reclosed, the contacts DR1 of the door-closing relay open to deenergize the reversing relay J.

The high-floor-call relay K is connected between the bus L—5 and the brush 34. It will be recalled that the brush 34 cooperates with the segments d1 to d11 of the selector. These contact segments are associated with a high-floor-call circuit 50 through which a circuit for the high-floor-call relay K is completed to the bus L+5.

The high-floor-call circuit 50 comprises break contacts of the floor-call-storing relays. It will be noted that the break contacts 2UR2 and 3DR2 are connected in series between the contact segments d2 and d3. In a similar manner, break contacts 3UR2 of the up-call-storing relay and break contact 4DR2 for the down-call-storing relay are connected in series between the contact segments d3 and d4. In a similar manner, each of the contact segments is connected to the circuit 50 at a point intermediate break contacts for the up-call-storing relay and break contacts for the down-call-storing relay for the floor represented by the contact segment. It will be noted that the contact segment d10 for the tenth floor is connected to the bus L+5 through the break contacts 10UR2 and 11DR2, which are, respectively, break contacts of the up-call-storing relay for the tenth floor and the down-call-storing relay for the eleventh floor. By inspection of Figure 4, it will be observed that the high-floor-call relay K remains energized as long as no call is registered from a floor above the position of the car. In connection with the circuit 50, an up floor call is considered to be a call above a car located at the floor at which the call is registered.

Make contacts P5 to P13 of the car balance relay P are provided for shunting the break contacts for the up-call-storing relays in the high-floor-call circuit 50. When the make contacts P5 to P13 are closed, the circuit 50 is converted into a high-down-floor-call circuit.

The low-zone, high-floor-call relay L is connected between the brush 44 and the bus L—5 through make contacts P2 of the car balance relay. The brush 44 cooperates with contact segments j3 to j9 of the selector. These contact segments cooperate with a circuit 51 and a contact bank of a stepping relay 60 for the purpose of defining the number of floors in the low zone and the highest down floor call in the low zone. Inasmuch as it is assumed that a low-zone car will not reverse when traveling up below the third floor and that the low zone will never extend above the ninth floor, only contact segments for the third to ninth floors are illustrated in Figure 4.

The number of landings in the low zone is determined by the position of a contact arm m of the stepping relay 60. This arm cooperates with a semicircular bank of contacts m3 to m9. Each of these contacts is connected to a corresponding one of the contact segments j3 to j9. The contact arm m is connected to the bus L+5 through break contacts NT1 of the zone-shift-responsive relay NT.

In the position of the arm m illustrated in Figure 4, the bus L+5 is connected to the contact m6. This means that the low zone contains landings up to and including the sixth floor. If the contact arm m were to rotate in a clockwise direction to engage the contact m5, the low zone would contain floors up to and including the fifth floor. In this way the position of the contact arm m determines the number of floors in the low zone and serves to divide the floors into a high zone and a low zone.

It will be recalled that the number of floors in each of the zones is selected to maintain a predetermined balance between the registered down floor calls for the high and low zones. If the registered down calls cannot be divided evenly between the two zones, the odd down call preferably is placed in the low zone. To this end, each pair of successive contacts in the semicircular row m3 to m9 has an auxiliary contact located therebetween. Thus, the auxiliary contact between the contacts $m3$ and $m4$ is identified by the reference character $m4A$. These auxiliary contacts are employed for the purpose of assigning the odd down floor call if present to the low zone; for example, let it be assumed that with the contact arm $m$ in the position illustrated in Figure 4, the zones have equal numbers of registered down floor calls. If an additional down floor call is registered in the low zone, the arm $m$ steps into engagement with the contact $m6A$. Since the auxiliary contact is still connected to the contact segment $j6$, it follows that the odd down floor call remains assigned to the low zone. Each of the auxiliary contacts is similarly associated with the corresponding contact segment in the row $j3$ to $j9$.

The down-call-storing relays 4DR to 9DR, inclusive, each has a set of break contacts located between a pair of the contact segments $j3$ to $j9$. For example, the break contacts 4DR3 for the down-call-storing relay associated with the fourth floor is connected between the contact segments $j3$ and $j4$ through break contacts 3LC1 of the auxiliary zoning relay for the third floor. In a similar manner, the break contacts 5DR3 of the down-call-storing relay for the fifth floor are connected between the contact segments $j4$ and $j5$ through the break contacts 4LC1 of the auxiliary zoning relay 4LC for the fourth floor. In a similar manner, each of the remaining sets of break contacts of the down-call-storing relays is connected between pairs of successive ones of the contact segments $j3$ to $j9$.

If one of the down-call-storing relays for a floor above the position of the elevator car A is energized, the associated break contacts located in the circuit 51 open. If such contacts are located in the low zone (that is, below the point of connection of the contact arm $m$ to the circuit 51), the low-zone, high-down-floor-call relay L cannot be energized until the brush reaches a contact segment which is above the open set of break contacts. Consequently, the relay L cannot operate to initiate a reversing operation of the car A when the car A is assigned for low-zone operation until the highest down floor call in the low zone has been answered.

The auxiliary zoning relays LC are employed for disconnecting all contact segments in the row $j3$ to $j9$, which are above the low zone. For example, with the contact arm $m$ in the position illustrated in Figure 4, the break contacts 6LC1 would be open. The auxiliary zoning relays will be discussed further in connection with Figure 7.

Figure 5:
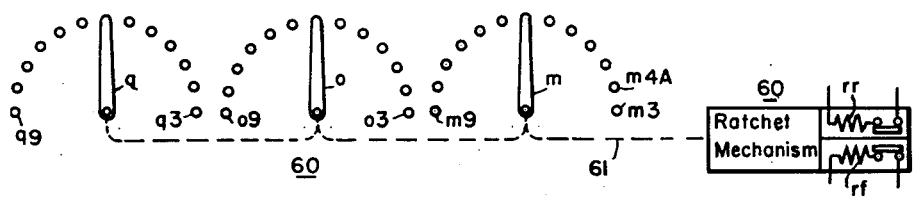
Figure 5 is a schematic view of a stepping relay which is employed in the elevator system embodying the invention.

Apparatus in Fig. 5

Figure 5 shows a stepping relay which may be employed in the elevator system. The stepping relay is well known in the art, but it is believed that a brief review of its operation is desirable.

The stepping relay may have a plurality of contact arms which are associated with banks of contacts. In the specific embodiment of Figure 5, three contact arms $m$, $o$, and $q$ are secured to a common shaft 61. As previously pointed out, the arm $m$ coacts with a bank of contacts $m3$ to $m9$. In a similar manner, the contact arm $o$ coacts with a bank of contacts $o3$ to $o9$, and the contact arm $q$ coacts with the bank of contacts $q3$ to $q9$. It will be understood that the contact arms $m$, $o$, and $q$ rotate in unison with the shaft 61.

The shaft 61 is rotated in a clockwise or counterclockwise direction by means of suitable ratchet mechanism. The ratchet mechanism may be operated by a winding $rf$ which when energized steps the shaft 61 in a forward or clockwise direction. Alternatively, the shaft 61 may be stepped in a reverse or counterclockwise direction by energization of a winding $rr$. The stepping relay of Figure 5 (as previously pointed out) is well known in the art and is sometimes referred to as an "add and subtract unit." At each step the arms $m$, $o$, and $q$ move from one contact of their respective banks to the next contact in the direction of movement of the arms.

Apparatus in Fig. 6

The high-zone car-counting relays 1H, 2H, and 3H and the low-zone car-counting relays 1L, 2L, and 3L are illustrated in Figure 6.

The relays 1H, 2H, and 3H are connected for energization in accordance with the number of cars in the high zone. If the energization corresponds to the presence of one car in the high zone, the relay 1H alone is energized sufficiently to pick up. The relay 2H is designed to pick up when energized with an energization corresponding to the presence of two cars in the high zone; it is designed to drop out if the energization thereafter drops to the value corresponding to the presence of one car in the high zone. In a somewhat similar manner, the relay 3H is designed to pick up when its energization corresponds to the presence of three cars in the high zone; it drops out when the energization thereafter drops to that corresponding to the presence of two cars in the high zone. Similarly, additional relays may be employed if additional elevator cars are employed in the bank. Each relay is designed with higher pick-up and drop-out energizations in order to provide a count of the elevator cars in the high zone. It will be understood that when one car is in the high zone, the relay 1H alone is energized. The presence of two cars in the high zone energizes the relays 1H and 2H sufficiently for both to pick up. Finally, the presence of three cars in the high zone is sufficient to cause all three of the relays to pick up.

The relays 1L, 2L, and 3L are designed similarly, respectively, to the relays 1H, 2H, and 3H.

The elevator car A energizes the relays 1H, 2H, and 3H through the resistor R2, or it energizes the relays 1L, 2L, and 3L through the resistor R3 depending upon whether the car is a high-zone car or a low-zone car. The zone discrimination is determined by a circuit 70, which includes break contacts of the relays 3LC to 9LC connected in series. One end of this circuit is connected to the relays 1H, 2H, and 3H through the resistor R2. The remaining end of the circuit is connected to the relays 1L, 2L, and 3L through the resistor R3 and make contacts X7 of the down preference relay.

The circuit 70 cooperates with contact segments $e1$ to $e11$ of the selector. These contact segments are engaged successively by the brush 40 as the elevator car moves in its hoistway. The brush 40 is connected to the bus L—7 through a resistor 40R and normally-closed contacts $27b$ of the by-pass switch. These contacts are opened when the car attendant actuates his by-pass switch 27 to prevent response of the car to floor calls.

When the elevator system is operating as a zoned system, one of the sets of contacts 3LC2 to 9LC2 of the auxiliary zoning relays is open to divide the circuits of Figure 6 into a high zone and a low zone. If it is assumed that the stepping relay 60 (Figure 5) is positioned to establish a low zone containing the lower six floors, the contacts 6LC2 of Figure 6 are open to establish what may be termed a load center between a low zone containing the lower six floors and a high zone containing floors seven to eleven, inclusive. It will be understood that as the service demands from the two zones vary, the load center may vary to a higher or lower position.

It will be recalled that a low-zone car is not expected to reverse below the third floor and that the low zone is not expected to extend above the ninth floor. For this reason, auxiliary zoning relays are shown only for the third to the ninth floors. However, if desired, the system may be extended to include additional floors; for example, an auxiliary zoning relay may be provided for the second floor and may have break contacts located in the circuit between the contact segments $e2$ and $e3$.

In Figure 6, the car A is assumed to be at the third floor. If the system is operating as a zoned system, the relay 6LC is energized and the contacts 6LC2 are open. If the car A is downwardly directed, the contacts X7 of the down preference relay are closed, and the following circuit is established for the low-zone car-counting relays: $L+7$, 1L, 2L, 3L, R3, X7, $e3$, 40, 40R, 27b, L—7. The low-zone car-counting relays are energized sufficiently to cause pickup of only the single relay 1L. If the car B similarly were directed down in the low zone, the low-zone car-counting relays also would be energized in a similar manner through the resistor BR3, and the resultant energization would be sufficient to cause pickup of both of the relays 1L and 2L. If a third car C were positioned in the low zone and were set for down travel at the same time, the low-zone car-counting relays would be further energized through the resistor CR3 and all three of the low-zone car-counting relays would be picked up.

If the car A were in the high zone, for example, at the ninth floor, the following circuit would be established for the high-zone car-counting relays: $L+7$, 1H, 2H, 3H, R2, 9LC2, $e9$, 40, 40R, 27b, L—7. This energization is independent of the direction of travel of the car A and is sufficient to cause pickup only of the relay 1H. If the car B were also in the high zone, additional energy would be supplied to the high-zone car-counting relays through the resistor BR2, and the resultant energization would be sufficient to cause pickup of the relays 1H and 2H. The presence of a third car C in the high zone at the same time would result in pickup of all three of the high-zone car-counting relays.

In the embodiment of Fig. 6, the brush 40 is just long enough to bridge the space between successive contact segments. As the car A enters the low zone on a down trip the brush 40 momentarily bridges contact segments on both sides of the open pair of contacts of the auxiliary zoning relays; in the assumed case contacts 6LC2. The relays 1L, 2L, 3L, 1H, 2H, 3H may have a time delay in operation sufficient to prevent this momentary bridging from "counting" the car as both a low zone and a high zone car during the momentary bridging. However, in the embodiment of Fig. 6, a resistor 40R is connected in series with the brush 40. During the aforesaid momentary bridging, the voltage drop across the resistor 40R limits the currents supplied to the resistors R2 and R3 in parallel to values which are insufficient to pick up a low zone car counting relay. At the same time the drop in current through the high zone car counting relays is insufficient to cause drop out of one of these relays.

If the car attendant operates his by-pass 27, the contacts 27b open to prevent energization therethrough of the car-counting relays. Consequently, as long as an elevator car is by-passing, it cannot be counted as either a high-zone or a low-zone car.

*Apparatus in Figure 7*

The quota relay LR, the car-balance relay P, the zone shift-responsive relay NT, and the auxiliary zoning relays 3LC to 9LC are illustrated in Fig. 7. Figure 7 also shows circuits for operating the stepping relay 60.

The quota relay LR is energized through a plurality of parallel circuits, each of which contains a set of make contacts of the down-call-storing relays and a resistor; for example, one of the parallel circuits contains the make contacts 2DR2 and a resistor 2R. Consequently, if a down call is registered from the second floor, the relay LR is partially energized through the make contacts 2DR2 and the resistor 2R. If at the same time a down call is registered from the fifth floor, the quota relay is energized additionally through the make contacts 5DR4 and the resistor 5R. It will be understood that the energization of the quota relay LR varies as a function of the number of down calls registered from the various floors. As a specific example, the relay LR may be designed to pick up when it is energized in accordance with four or more down floor calls. After it has picked up, the relay may be designed to drop out when its energization drops below a predetermined value, such as the energization corresponding to one less than the number of down floor calls causing pickup. The energization of the quota relay may be controlled by means of an adjustable resistor R4, which is connected in shunt across the quota relay. By suitable adjustment of the resistor, the quota relay may be adjusted to pick up only if energized by more than any predetermined number of down floor calls.

By suitable selection or adjustment of the resistors 2R to 11R, the energy supplied to the quota relay LR may differ for the various floors. If the resistors are all equal in value, each floor exercises the same effect on the quota relay. If it is desired to weight one of the floors, such as the fifth floor, the resistor 5R may be decreased in value in order to supply more current to the quota relay. If desired, the resistors may be of a type which decreases in resistance as a function of the duration of energization thereof. Under such circumstances, the energization of the quota relay increases as a function of the time during which down floor calls remain unanswered. However, it will be assumed for the present that the resistors 2R to 11R are all equal in value.

When the elevator system is operating as a zoned elevator system, the car-balance relay P determines to which of the zones an available car will be assigned. This relay can be energized only if the make contacts LR1 of the quota relay LR are closed to indicate that the quota for down service has been reached or exceeded.

The car-balance relay P is energized through a plurality of parallel circuits, the number corresponding to the number of elevator cars employed in the system. Thus, one of the parallel circuits includes in series break contacts 1L1 and make contacts IHI, respectively, of the low and high-zone car-counting relays. A second one of the parallel circuits includes in series the break contacts 2LI and the make contacts 2HI of the low and high-zone car-counting relays. A third one of the parallel circuits employed if the system includes at least three elevator cars has the break contacts 3LI and the make contacts 3HI of the low and high-zone relays in series.

By considering the various combinations of the contacts in the parallel circuits, the conditions under which the various available elevator cars are assigned to the zones can be determined. Let it be assumed that the quota for the system has been reached and that the quota relay LR has been energized sufficiently to close its make contacts LRI. If the contacts ILI, 2LI, 3LI, IHI, 2HI and 3HI are in the positions illustrated in Figure 7, it is clear that no car is operating either as a high-zone or low-zone car. Consequently, the contacts PI and P4 (Figure 3) are closed and permit the cars to answer up floor calls. In addition, the contacts P2 and P3 (Figure 4) are open and prevent the elevator cars from operating as low-zone elevator cars. The contacts P5 to P13 (Figure 4) are open to make effective all break contacts of the call-storing relays in the circuit 50. Consequently, as long as no elevator car is assigned to the low zone, it follows that all of the elevator cars are conditioned to operate as high-zone cars.

Let it be assumed next that one of the elevator cars has entered the high zone and that it has caused the energization of the high-zone car-counting relay IH (Figure 6). This completes the following circuit for the relay P: L+9, ILI, IHI, LRI, P, L—9. The relay P when energized opens its break contacts PI and P4 (Figure 3) to prevent up-traveling elevator cars from answering up floor calls. However, if a car call has been registered in an elevator car, such as the elevator car A, the high-car-call relay H is energized to close its make contacts HI. This permits the elevator car A to answer up floor calls despite the opening of the contacts PI.

The energization of the relay P also results in closure of the make contacts P2 and P3 (Figure 4). Low-zone, high-down-floor-call relays L and BL, consequently, are prepared for energization. If either of these elevator cars is in the low zone and is traveling up, it will reverse at the highest down floor call in the low zone. It will be recalled that such reversal can be obtained only if the up-traveling low-zone car has no car call registered for a floor above the position of the car.

A further result of the energization and pickup of the car-balance relay P is the closure of the make contacts P5 to P13 (Fig. 4). This closure causes an up-traveling car in the high zone to reverse at the highest down floor call (if no car call is registered) and expedites the return of an elevator car to the low zone to restore the car balance.

As soon as an elevator car is set for down travel in the low zone with its by-pass unoperated, it becomes a low-zone car, and the break contacts ILI open to deenergize the car-balance relay P (Figure 7). This restores the system to the condition wherein no up-traveling car reverses in the low zone. Consequently, the next available elevator car must enter or is assigned to the high zone.

If the system has one elevator car assigned to the low zone and two elevator cars assigned to the high zone, the contacts ILI and 3HI in Figure 7 are open, and the remaining contacts IHI, 2HI, 2LI and 3LI are closed. This completes the following energizing circuit for the relay P: L+9, 2LI, 2HI, LRI, P, L—9. As a result of the energization of the relay P, the next available elevator car is assigned to the low zone.

In this way the car-balance relay P tends to maintain a predetermined balance between the elevator cars in the high and low zones. As long as the desired distribution of cars is maintained all of the elevator cars operate on the normal high call reversal circuit 50 (contacts P5 to P13 are open in Figure 4), and answer all up floor calls regardless of the number of down floor calls. Inasmuch as the high-zone elevator cars have longer distances to travel, the system places an odd available elevator car in the high zone.

The relay NT is associated with the stepping relay 69. For forward or clockwise rotation of the stepping relay 69, the contacts RFI of a forward relay RF are closed. For reverse or counterclockwise rotation of the stepping relay, the contacts RRI of a reversing relay RR are closed. To prevent a false stop of the elevator cars during such operation of the stepping relay, a zone-shift-responsive relay NT may be provided. This relay may have a time delay in dropout sufficient to prevent it from dropping out during the intervals between pulses of the stepping relay while one of the relays RF or RR is energized. For example, with commercial stepping relays, a delay of the order of one-tenth of a second on dropout may suffice for the relay NT. The stepping relay may make 60 or more steps per second. Consequently, as long as the stepping relay is stepping in either direction, the relay NT remains picked up. The relay NT when energized opens its break contacts NTI (Figure 4) to prevent energization of the low-zone, high-down-floor-call relay L.

The energization of the auxiliary zoning relays 3LC to 9LC is controlled by the arm $o$ of the stepping relay, which cooperates with a bank of contacts $o3$ to $o9$ in a manner similar to the cooperation of the arm $m$ with the contacts $m3$ to $m9$ of Figure 4.

Except for the auxiliary zoning relay 3LC for the lowest floor provided with such a relay, each of the auxiliary zoning relays may be energized upon engagement of the contact arm $o$ with either a main contact or an auxiliary contact. For example, the auxiliary zoning relay 6LC may be energized by engagement of the arm $o$ either with the main contact $o6$ or the auxiliary contact $o6A$. This is for the same reason explained in connection with Figure 4 for the arm $m$. It is intended to permit the assignment of an odd down floor call to a predetermined zone (in this case, the low zone). Thus, in Figure 7 it is assumed that the low zone includes the sixth floor and all lower floors and that the down floor calls are divided equally between the two zones. If an additional down floor call is registered in the low zone, the arm $o$ steps into engagement with the contact $o6A$. However, this does not change the number of floors in each of the zones, and it follows that the odd down floor call in effect is assigned to the low zone.

*Apparatus in Figure 7B*

Figure 7B shows circuits suitable for operating the relays RF and RR, which control the operation of the stepping relay 60. The stepping relay could be operated manually in accordance with floor calls by a starter or other attendant, but preferably it is automatically operated. The circuits are energized from buses AC10 and AC10A, which represent a single-phase source of alternating current such as the usual commercial source having a frequency of sixty cycles per second. The circuits heretofore considered have been energized from direct-current sources represented by the buses L+1, L—1 to L+9, L—9.

In the embodiment of Figure 7B, two electronic tubes 78 and 79 are disclosed. These tubes may be of the high-vacuum type, but preferably are gaseous discharge tubes, which are known commercially as thyratrons. The tube 78 has a cathode 78c, a control electrode or grid 78g, and an anode 78a. In a similar manner, the tube 79 has a cathode 79c, a grid 79g, and an anode 79a. Each cathode has a terminal connected to ground and a second terminal connected to a terminal 81 of the secondary winding of a transformer 80. The remaining terminal of the secondary winding is grounded. The primary winding of the transformer 80 is connected for energization from the buses AC10 and AC10A through a switch 80S, which is closed as long as the system is in operation. The remaining circuits for controlling the energization of the relays RF and RR are energized from the buses AC10 and AC10A through make contacts LR2 of the quota relay. When the contacts LR2 are closed, a conductor AC11 is connected to the bus AC10 therethrough. If the conductor L11 were connected continuously to the bus L10 the systems would be operative. However, the provision of the contacts LR2 reduces energy consumption and unnecessary operations of several components.

By inspection of Figure 7B, it will be noted that a circuit 82 is provided, which includes in series and in the order of the floors represented thereby break contacts of the down floor-call-storing relays. The circuit 82 is connected between the bus AC10A and the conductor AC11 through resistors R5 and R6. Each of the break contacts in the circuit 82 has connected thereacross a resistor 2RR to 11RR. These resistors have equal resistance values. The resistors 4RR to 9RR have center taps.

In order to illustrate the comparative values of the resistors, suitable unit values are indicated in circles adjacent each of the resistors. The size of the unit depends on the requirements of the particular circuit components employed. For present purposes, it may be assumed that each of the values in the circles represents a resistance value in ohms.

The resistors 4RR to 9RR and the center taps thereon are connected successively to the contacts q3 to q9 associated with the contact arm q of the stepping relay 69. The contacts associated with the center taps are identified by the suffix A and are for the purpose of providing a proper response for conditions wherein an odd down floor call must exist in one of the zones.

The contact arm q is connected through the primary windings of two transformers 83 and 84 to a center tap 85 on a resistor R7. The unit value or resistance of each half of the resistor R7 is indicated in a circle as 100. The resistor R7 is connected between the conductor AC11 and the bus AC10A.

By tracing through the circuits of Figure 7B, it will be found that the primary windings of the transformers 83 and 84 are connected for energization through a Wheatstone bridge system. Two arms of the bridge are fixed and consist of one-half each of the resistor R7. The remaining arms of the bridge are variable, and the resistance depends on the position of the contact arm q and on the conditions of the break contacts in the circuit 82.

The transformer 83 has its secondary winding connected between the grid and cathode electrodes of the tube 79. The secondary winding of the transformer 84 is connected between the grid and cathode electrodes of the tube 78. A common biasing battery 87 is provided for biasing the grids of the two tubes with respect to their cathodes to values such that the tubes normally are cut off when no input is supplied through the transformers 83 and 84.

The anode circuits of the two tubes are energized from two transformers 88 and 89, which are connected in series between the conductor AC11 and the bus AC10A. The secondary winding of the transformer 88 and the relay RR are connected in series across the anode and cathode electrodes of the tube 78. The secondary winding of the transformer 89 and the relay RF are connected in series across the anode and cathode electrodes of the tube 79.

For the purpose of explaining the operation of the circuit shown in Figure 7B, it will be assumed that the switch 80S and the contacts LR2 are closed. It will be assumed further that the secondary windings of the transformers 88 and 89 have at some instant polarities represented by the conventional reference characters, + for positive and — for negative.

It will be assumed further that down floor calls have been registered for the second, third, ninth and tenth floors. If the components otherwise are as shown in Figure 7B, it follows that the bridge is balanced and that the transformers 83 and 84 supply no inputs to the tubes 78 and 79. Consequently, the tubes being biased to cutoff do not supply any energy to the relays RF and RR.

Next let it be assumed that an additional down floor call is registered from the eighth floor. Such registration results in opening of the contacts 8DR5 to introduce additional resistance into one arm of the Wheatstone bridge. As a result of the unbalance of the bridge, the transformers 83 and 84 now have outputs. The polarities of the terminals of the secondary windings of the transformers 83 and 84 are assumed to have the polarities represented by the conventional markings, + and —, at the instant the secondary windings of the transformers 88 and 89 have the indicated polarities.

The input from the transformer 84 to the tube 78 merely increases the negative bias for the tube 78, and the relay RR remains unenergized. However, the output of the transformer 83 supplies a positive input for the grid of the tube 79, which is sufficient to overcome the negative bias introduced by the battery 87 and to fire the tube 79. Resultant energization of the forward relay RF causes the stepping relay to step in a clockwise or forward direction until the bridge is again balanced. Such balance occurs when the contact arm q engages the contact q6A.

Let it now be assumed that a down floor call is registered from the fourth floor. The resulting opening of the break contacts 4DR5 unbalances the Wheatstone bridge in the opposite direction. At the instant the secondary windings of the transformers 88 and 89 have the indicated polarities, the secondary windings of the transformers 83 and 84 would have polarities opposite to those illustrated. This results in firing of the tube 78 and energizing of the relay RR to produce stepping of the stepping relay in a reverse or counterclockwise direction until the bridge again is balanced. In this way the stepping relay is continuously directed to a position dividing the down floor calls between the zones substantially evenly.

Operation with quota unfilled

The first operation assumed will be that of cars A and B as normal high-call-reversal cars standing at the lower terminal with the doors (not shown) closed and with no stop calls registered. Under these conditions, the door relay DR, the up-direction preference relay W, and the high-floor-call relay K of car A are in energized condition. The door relay DR is energized because all the doors are closed, thus completing the circuit: L+1, door contacts, DR, L—1 (Figure 1). The relay W is energized because the bottom terminal switch 30B is open thus deenergizing relay X which closes its back contact X2. The circuit for relay W extends: L+1, D6, X2, J2, W, 30T, L—1. The relay K is energized because no calls are registered to affect the circuit 50 (Figure 4).

With the door closed, the car attendant in car A closes the car switch CS temporarily to start the car upwardly by energizing the up-direction switch U and the car-running relay M through the following circuit: L+1, CS, CS1, W1, F1, STU, U, M, 23, L—1.

The energized relay M closes its contacts M1, M2, and M3 and opens its contacts M4 to prepare the control system of car A for operation.

The energized up-direction switch U closes its contacts U1, U2, U3, U4, and U5 and opens its contacts U6 to start the car upwardly. The closing of contacts U1 energizes the brake coil 29 to release the brake 15 (Figure 1). The closing of the contacts U2 and U3 energizes the field winding GF of the generator GE by the circuit: L+1, U2, GF, U3, R1, L—1. The energization of the field winding GF causes the motor to supply energy to the hoisting motor 14 for operating the drum 11 to move car A upwardly.

The closing of the contacts U4 energizes the high-speed relay V by the circuit: L+1, U4, VTU, E1, V, L—1. The energized relay V closes its contacts V1 thereby shorting the resistor R1 in the circuit of the generator field winding GF, thus increasing the energization of the field winding GF to cause the motor 14 to move the car upwardly at its normal high speed.

It will be assumed now before car A reaches the second floor that a waiting down passenger at the ninth floor operates the down call button 9D (Figure 3) to register a down stop call for that floor. The operation of button 9D energizes the relay 9DR by the circuit: L+3, 9D, 9DR, L—3. The energized relay 9DR closes its contacts 9DR1 in its self-holding circuit. It also supplies energy to the contact segments g9 and Bg9 to stop the next approaching car, which is conditioned to serve it. The operated relay 9DR also opens its contacts 9DR2 in the high-call circuit 50 (Figure 4), thereby deenergizing the high-floor-call relay K. The deenergized relay K opens its contacts K1 in the circuit of the high-call-reversal relay J. Contacts 9DR3 and 9DR5 open and contacts 9DR4 close, but these contacts have no effect on the operation of the system under the assumed condition.

It will be assumed that car A moves upwardly in the hatchway on its up trip with no call registered above it except the down call at the ninth floor. As it approaches the ninth floor, its brush 34 (Figure 4) engages the energized contact segment d9 and thereby energizes the high-floor-call relay K by the circuit: L+5, 11DR2, 10UR2, 10DR2, 9UR2, d9, 34, K, L—5. The energized relay K closes its contacts K1 and thereby energizes the high-call reversing relay J by the circuit: L+5, J, H2, K1, W7, L—5.

The energized relay J closes its contacts J1 (Figure 1) thereby energizing the slow-down inductor relay E, the stopping inductor relay F and the inductor holding relay G to effect the stopping of the car at the ninth floor. The relay G closes its contacts G1 to hold the energizing circuit for the inductor relays.

As car A approaches closer to the ninth floor, its inductor relay E comes opposite the up plate UEP for that floor, and its contacts E1 are opened, thus deenergizing the high-speed relay V. The relay V opens its contacts V1 to insert the resistor R1 in the circuit of the generator field winding GF thereby decreasing the speed of the hoisting motor 14 and thus slowing down the car. As the car approaches still closer to the ninth floor, its stopping relay F comes opposite the up stopping plate UFP for that floor, which opens its contacts F1, thereby deenergizing the car-running relay M and the up-direction switch U. The switch U opens its contacts U1 in the brake circuit and opens its contacts U2 and U3 in the circuit of the generator field winding GF, thus stopping the car and applying the brake to hold it at the ninth floor.

At the same time, the contacts J2 of the energized high-call reversing relay J are open in one of the parallel circuits of the up-direction preference relay W. Therefore, when the contacts M2 of the car-running relay M are opened for the ninth floor stop, they open the other parallel circuit for the relay W and thus deenergize it. The deenergized relay W thereupon closes its back contacts W2 which energizes the down preference relay X by the circuit: L+1, U6, W2, X, 39B, L—1. The deenergized relay W also opens its contacts W1 in the circuit of the up-direction switch U, and the down preference relay X closes its contacts X1 in the circuit of the down direction switch D. This prepares the car for down operation, and when the attendant closes the starting switch CS, the car will start downwardly.

Assuming now that the attendant closes the car switch CS, he thereby energizes the down direction switch D and the car-running relay M by the circuit: L+1, CS, CS1, X1, F2, STD, D, M, 23, L—1. The energized switch D and the relay M cause the car to move downwardly to the first floor where the arrival of the car opens the lower limit switch STD to deenergize the down-direction switch D.

Also, as the car reaches the first floor, it opens its bottom terminal switch 30B to deenergize the down preference relay X which, in turn, closes its back contacts X2 to energize the up-direction preference relay W to condition the car for up-direction operation.

It is seen by the foregoing description how a normal car operates on an up trip to reverse itself at the highest down call when there are no up calls above it to be answered.

If a car call were registered for the tenth floor while the car A moved upwardly, the car would not have stopped at the ninth floor in answer to the down call from the ninth floor. This is for the reason that the high-car-call relay H (Figure 3) would remain energized until the car reached the tenth floor. Since the energized high-car-call relay H would maintain the break contacts H2 open (Figure 4), the high-call reversing relay J would not have been energized until the car A reached the tenth floor. However, after it had answered the car call at the tenth floor, the car A would reverse at the tenth floor in the manner previously discussed with reference to the ninth floor and would stop at the ninth floor in response to the down call from the ninth floor.

The stopping of the elevator car A at the ninth floor during its down travel will be understood from a brief consideration of Figure 3. As the car moves from the tenth floor towards the ninth floor, the brush 42 engages the contact segment $g9$ to complete the following circuit: L+3, 9DR1, $g9$, 42, X5, S, $27a$, L−3. The energization of the floor-call stopping relay S results in closure of the make contacts S1 (Figure 1) to energize the inductor relays E and F and the inductor holding relay G. The inductor relays cooperate with the down inductor plates to slow down and stop the elevator car A at the ninth floor in a manner which will be understood from the discussion of their cooperation with the up inductor plates to stop the elevator car during its up travel. In this way the elevator car A stops during its down travel to answer down floor calls.

As the elevator car stopped at the ninth floor the break contacts M4 closed to complete the following cancelling circuit: L+3, 9DR1, 9DRN, $j9$, 41, X6, M4, L−3. Since the coils 9DR and 9DRN are wound to oppose each other, the energization of the coil 9DRN cancels the call at the ninth floor.

The stopping of the elevator car in response to car calls is effected by energization of the car-call relay T. As the elevator car A neared the tenth floor during its up travel, the brush 31 (Figure 3) engaged the contact segment $a10$ for the tenth floor to complete the following circuit: L+3, 10c, $a10$, 31, W3, T, M3, L−3. The relay T causes its make contacts T1 (Figure 1) to energize the relays E, F, and G. These cooperate to stop the elevator car at the tenth floor in a manner which will be understood from the previous discussion.

Let it be assumed next that a car call is registered for the third floor as the car A descends. As the car nears the third floor, the brush 43 (Figure 3) engages the contact segment $h3$ to complete the following circuit: L+3, 3c, $h3$, 43, X3, T, M3, L−3. The energization of the car-call stopping relay results in closure of the contacts T1 (Figure 1) to energize the relays E, F, and G. These relays operate to stop the elevator car at the third floor in the manner previously discussed.

*Operation with quota filled*

I. GENERAL

Next it will be assumed that down floor calls have been registered from the third, fourth, eighth, and ninth floors. Referring first to Figure 7B, it will be noted that the registration of these four calls results in closure of the make contacts 3DR3, 4DR4, 8DR4, and 9DR4. Closure of these four sets of contacts supplies sufficient current to quota relay LR to pick up this relay.

The quota relay closes its contacts LR1 to prepare the car-balance relay P for energization. Also contacts LR2 close to prepare the stepping relay for operation. It will be assumed further that the switch 89S is closed and that the cathodes of the tubes 78 and 79 are heated. Upon closure of the contacts LR2, the Wheatstone bridge associated with the transformers 83 and 84 is energized and the stepping relay 60 maintains the Wheatstone bridge in balance.

Inasmuch as it is assumed that down floor calls are registered at the third, fourth, eighth, and ninth floors, it follows that the break contacts 3DR4, 4DR5, 8DR5, and 9DR5 are open. With these contacts open, the Wheatstone bridge is balanced with the contact arm $q$ in the position illustrated in Figure 7B. As a matter of fact, the Wheatstone bridge would remain in balance for any position of the contact arm $q$ between the contacts $q5A$ and $q7A$. The only requirement placed on the position of the contact arm $q$ is that it places approximately equal numbers of down floor calls in each of the zones.

During any movement of the stepping relay, the zone-shift-responsive relay NT is energized and opens its break contacts NT1 to prevent a false energization of the low-zone, high-down-floor-call relay L (Figure 4).

As shown in Figure 7, the contact arm $o$ selects one of the auxiliary zoning relays which divides the floors into the two zones. In the present case, it is assumed that the sixth floor is the highest floor in the low zone, and the contact arm $o$ consequently energizes the auxiliary zoning relay 6LC.

The auxiliary zoning relay opens its break contacts 6LC1 (Figure 4) to prevent energization of the contact segments $j7$, $j8$, and $j9$ therethrough. The contact arm $m$ is connected directly to the contact segment $j6$, which is the highest floor in the low zone. Consequently, any elevator car assigned to the low zone must reverse at or below the sixth floor.

The auxiliary zoning relay 6LC also opens its break contacts 6LC2 (Figure 6) to divide the contact segments $e1$ to $e11$ into a high-zone and a low-zone group. In a similar manner, the relay opens its break contact 6LC3 to establish a high-zone and a low-zone group of contact segments for the car B. A similar division of contact segments would be provided for each elevator car employed in the system.

*Operation with quota filled*

II. ALL CARS IN LOW ZONE SET FOR UP TRAVEL

It will be assumed that the elevator car A is at the third floor set for up travel and that the elevator car B and any other car of the system are at the first floor set for up travel. Referring first to Figure 6, it will be noted that none of the cars is counted by the car-counting relays. Thus, the car A is in the low zone, but since it is set for up travel, the make contacts X7 of the down preference relay are open and the car A cannot energize the car-counting relays 1L, 2L, and 3L. Similar comments apply to the remaining car or cars.

By reference to Figure 7, it will be noted that the car-balance relay P is deenergized. This is because all of the contacts 1H1, 2H1, and 3H1 are open. Since the relay P is deenergized, its break contacts P1 and P4 (Fig. 3) are closed. Cars A and B consequently can answer up floor calls in a normal manner.

In Figure 4, contacts P2, P3 and P5 to P13 are open. Consequently, the cars must operate on the normal high-call-reversal circuit 50.

*Operation with quota filled*

III. CAR A ENTERS HIGH ZONE; CAR B ASSIGNED TO LOW ZONE

It will be assumed next that the car A enters the high zone. As shown in Figure 6, the car A on entering the high zone moves its brush 40 into engagement with one of the contact segments e7 to e11 to energize the high-zone car-counting relays through the resistor R2. The energization of the relay 1H is sufficient to cause this relay to pick up.

The relay 1H closes its make contacts 1H1 (Fig. 7) to complete the following circuit for the car-balance relay P: L+9, 1L1, 1H1, LR1, P, L−9. The relay P opens its break contacts P1 and P4 (Figure 3) to prevent the elevator cars from answering up floor calls. However, if any of the elevator cars, such as the car A, has a car call registered for a floor above the position of the car, its contacts H1 are closed to shunt the contacts P1 and permit the elevator car A to respond to up floor calls.

By reference to Figure 4, it will be observed that the relay P when energized closes its make contacts P2 and P3. Such closure permits energization of the low-zone high-down-floor-call relays L or BL to reverse the elevator cars, if traveling up, at the highest down floor call in the low zone. Also contacts P5 to P13 close to convert the circuit 50 into a high-down-floor-call circuit. Consequently if an up-traveling elevator car in the high zone has no unanswered registered car calls, it will reverse at the highest registered down-floor call.

Since the elevator car A has entered the high zone, it is clear that the brush 44 is positioned above the contact segment j6 and that the relay L cannot be energized through the contact arm m. However, the car B is assumed to be in the low zone and is set for up travel; therefore, the car B may reverse at the highest down floor call in the low zone (in this case the down call from the fourth floor). When the car B reaches the fourth floor, the following circuit is completed: L+5, NT1, m, m6, 6DR3, 5LC1, 5DR3, 4LC1, Bj4, B44, BL, P3, L−6. Consequently, the contacts BL1 close to establish an energizing circuit for the high-call reversing relay BJ in a manner which will be clear from the previous discussion of the operation of the relay J. It should be noted further that if the car B had a registered car call for a floor above the position of the car, such as the sixth floor, the contact BH2 of the high-car-call relay for the car B would be open to prevent energization of the reversing relay BJ.

The system thus tends to expedite the return of a high zone car or the assignment of an available car in the low zone to serve the down-floor calls in the low zone and to thereby restore the desired car balance.

From the preceding discussion, it is clear that an elevator car is available for assignment by the circuit 51 as a low-zone car only if it is set for up travel in the low zone and if it has no car call registered for a floor above the position of the car. When the car B answered the down floor call at the fourth floor the call was cancelled and the down-floor-call storing relay 4DR was reset. The contacts 4DR4 (Fig. 7) opened to permit the quota relay LR to drop out, assuming that only three down floor calls remained registered. The resultant opening of the contacts LR1 and the deenergization of the relay P terminated the zone operation of the system.

Let it be assumed next that the down floor call at the fourth floor is again registered as the car B leaves the fourth floor and that the relays LR and P are reenergized.

Referring again to Figure 6, when the elevator car B reversed at the fourth floor, it became a low-zone car set for down travel. (It is assumed that this occurs before the car A returns to the low zone.) Since the elevator car B is set for down travel, the contacts BX7 of the down preference relay are closed, and the low-zone car-counting relays 1L, 2L, and 3L are energized through the resistor BR3. The energizing circuit is as follows: L+7, 1L, 2L, 3L, BR3, BX7, 3LC3, Be4, B40, B27b, L−8.

The low-zone car-counting relay 1L now is energized sufficiently to pick up and opens its break contacts 1L1 (Figure 7). This interrupts the energization of the car-balance relay P. The car-balance relay closes its break contacts P1 and P4 (Figure 3) to permit elevator cars to answer up floor calls. Also, contacts P2 and P3 (Figure 4) are opened to prevent a reversal of another elevator car in the low zone. Contacts P5 to P13 open to restore the high-call reversal circuit for what may be termed "normal" operation. Consequently, the next elevator car set for up travel in the low zone must operate on the normal high-call-reversal circuit 50.

*Operation with quota filled*

IV. CAR A RE-ENTERS LOW ZONE

Let it be assumed now that the car A has reversed in the high zone and that it has re-entered the low zone during a down trip. As the elevator car enters the low zone, its brush 40 (Figure 6) leaves the contact segment e7 and engages the contact segment e6. As soon as the contact segment e7 is passed by the brush 40, the energization of the high-zone car-counting relays through the resistor R2 is discontinued. It will be recalled that the brush 40 momentarily is connected to both the contact segments e6 and e7. However for such momentary connection, current flowing through the resistor 40R divides between the resistors R2 and R3. The value of the resistor 40R is coordinated with the car counting relays to prevent pick-up or drop-out of a car counting relay during the momentary connection. That is, current through the high-zone car counting relay drops during the momentary connection, but the drop is insufficient to permit drop out of a relay. Current supplied to the low-zone car counting relays increases, but the increase is insufficient to permit pick-up of a relay during the momentary connection.

Upon engagement of the contact segment e6 and disengagement of the segment e7 by the brush 40, the low-zone car-counting relays are energized through the resistor R3, and the car A now is connected as a low-zone car. Turning now to Figure 7, the foregoing transition of the car A from a high-zone to a low-zone car is accompanied by reopening of the contacts 1H1. Furthermore, since we assume that the car B is being counted as a low-zone car, the energization of the low-zone car-counting relays is sufficient to pick up both of the relays 1L and 2L (Figure 6). In Figure 6 the break contacts 1L1 and 2L1 are both open.

When the car A reaches the first floor, the down preference relay X (Figure 1) is deenergized and the make contacts X7 (Figure 6) open.

This interrupts the energization of the low-zone car-counting relays through the resistor R3, and the car A is no longer counted as a low-zone car. Substantially the same result would have been achieved at a higher floor had the by-pass switch for the car A been operated by the car attendant. Such operation would have resulted in opening of the contacts 27b (Figure 6) to interrupt the energization of the low-zone car-counting relays through the resistor R3.

*Apparatus in Fig. 8*

In Figure 7B, circuits are illustrated for maintaining the stepping relay at a position dividing the floors into two zones having substantially equal numbers of down floor calls. Figure 8 shows an alternative system for operating the stepping relay to divide the floors into zones having substantially equal quantities each representing a function of the number of down floor calls in a zone and the time during which each of the down floor calls has remained unanswered.

The tubes 78 and 79, the relays RR and RF, and the transformers 88 and 89 of Figure 7B are employed in the embodiment of Figure 8; however, the inputs for the two tubes are derived in a somewhat different manner.

In place of the contact arm $q$ of Figure 7B, the embodiment of Figure 8 includes two contact arms $t$ and $y$ of the stepping relay, each of which cooperates with a separate bank of contacts $t3$ to $t9$ and $y3$ to $y9$, respectively. These contact arms and contacts are similar in construction and operation to the arm $q$ and its associated contacts. The contact arms $t$ and $y$ move in unison to engage corresponding contacts.

The contacts $t3$ to $t9$ are associated with a circuit 90, which includes in series (arranged in the order of the floors) contacts of the down-call storing relays for the second to the ninth floors. By inspection of Figure 8, it will be noted that two sets of contacts for each of the down-call-storing relays are provided for each of the fourth to the ninth floors. Each of the sets of contacts has connected thereacross two circuits in parallel. One of the circuits includes in series a resistor, a rectifier, and the secondary winding of a transformer. The other of the circuits comprises a capacitor and a resistor connected in series. For example, the first circuit connected across the contacts 9DR8 comprises a resistor 90R, a rectifier 90Z, and the secondary winding 90Y. The second parallel circuit associated with the contacts 9DR8 includes a capacitor 90C and a resistor 90RR. One terminal of the circuit 90 is connected to the contact $t9$. The remaining contacts $t3$ to $t9A$ each is connected to the circuit 90 at a point intermediate two adjacent sets of contacts of the circuit. For example, the contact $t9A$ is connected to the circuit 90 at a point between the contacts 9DR8 and 9DR9. As a further example, the contact segment $t3$ is connected to the circuit 90 between the sets of contacts 3DR8 and 4DR9. With this description it is believed that the circuit arrangements can be ascertained by inspection of Figure 8.

The circuit 91 is similar to the circuit 90 except for the omission of contacts of the call-storing relays for the second and third floors and the addition of contacts for the call-storing relays for the tenth and eleventh floors. The contacts $y3$ to $y9$ are associated with the circuit 91 in a manner which is similar to that associating the contacts $t3$ to $t9$ with the circuit 90. The capacitors, resistors, rectifiers, and transformer secondaries associated with the circuit 91 are similar to those illustrated for the circuit 90. Thus, the capacitor 91C, the resistor 91RR, the resistor 91R, the rectifier 91Z, and the transformer secondary winding 91Y correspond, respectively, to the capacitor 90C, the resistor 90RR, the resistor 90R, the rectifier 90Z, and the transformer secondary winding 90Y of the circuit 90. No $y$ and $t$ contacts for the second, third, tenth and eleventh floors are required because of the assumption that cars do not reverse below the third floor and the low zone never extends above the ninth floor.

It will be recalled that the upper terminal of the circuit 90 is connected to the contact $t9$. By inspection of Figure 8, it will be observed that the contact $y3$ is connected to the lower terminal of the circuit 91. The remaining terminals of the circuits 90 and 91 are connected by means of a conductor 93.

Conveniently, each of the secondary windings may be associated with a common primary winding of a transformer 94. Thus, the transformer 94 may have a single primary winding and thirty-two low-voltage secondary windings. The primary winding is energized from an alternating current source through make contacts LR3 of the relay LR.

All of the contacts for the down-call-storing relays illustrated in Figure 1 are break contacts, which are closed when the relays are deenergized. However, in order to illustrate the operation of the embodiment illustrated in Figure 8, it is assumed that down floor calls have been registered for the third, fifth, eighth, ninth, and tenth floors, and the break contacts for the down-floor-call storing relays are shown open for the floors at which down floor calls have been registered.

When a set of contacts of the down-call-storing relays opens, the capacitor associated with the set of contacts is slowly charged from the associated secondary winding through the associated rectifier. The resistance included in the charging circuit may be such that a predetermined time, such as sixty seconds, is required for the capacitor to reach approximately its full charge.

The transformers associated with the second, third, tenth, and eleventh floors are identified by the reference character 90YY or 91YY and may have a preselected R. M. S. voltage, such as eight or ten volts. The remaining transformers 91Y and 90Y have voltage outputs half as large, or for the assumed case the voltages may be of the order of four or five volts. The capacitors are charged only when their respective contacts of the down-call-storing relays are open. The parameters of the circuits may be selected so that the capacitors 90C and 91C are gradually charged to a voltage of the order of three volts in about sixty seconds. As representative of suitable values, the resistors 90R and 91R may have resistances of the order of four or five megohms; the capacitors may have capacitances of the order of four or five microfarads; the discharge resistors 90RR and 91RR may have resistances of the order of ten ohms for the purpose of limiting the discharge currents of the capacitors to values that will not injure the associated contacts.

By inspection of Figure 8, it will be observed that the contact arm $t$ is connected through a resistor $78r$ and a biasing battery $78y$ to the grid electrode of the tube 78 and that the contact arm $t$ also is connected to the cathode electrode of the tube 79. In a somewhat similar manner, the contact arm $y$ is connected through a resistor 79r and a biasing battery 79y to the grid electrode of the tube 79 and is also connected to the cathode electrode of the tube 78.

*Operation of apparatus shown in Fig. 8*

It will be understood that the purpose of the apparatus illustrated in Figure 8 is to divide the elevator system into zones. The number of floors in each of the zones depends on the time during which each down call registered from a floor remains unanswered.

In the specific embodiment of Figure 8, each down floor call during its registration is represented by a voltage which increases in magnitude with time. The voltages representing all registered down floor calls in the high zone are added to provide a high-zone total voltage. The voltages for all down floor calls registered in the low zone are added to provide a low-zone total voltage. The high-zone total voltage and the low-zone total voltage are compared, and if they do not bear a substantially predetermined relationship relative to each other, the number of floors in the zones are adjusted until the desired relationship is substantially achieved.

Thus, it may be desired to maintain the high and low-zone total voltages substantially equal. This does not mean necessarily that the number of registered down floor calls in the low zone equals the number of registered down floor calls in the high zone for equal high-zone and low-zone total voltages. For example, three down floor calls in the low zone which have been registered for a long time may outweigh five down floor calls in the high zone which have been registered only for a brief time.

In considering the operation of the apparatus illustrated in Figure 8, it will be recalled that down floor calls have been assumed to have been registered at the third, fifth, eighth, ninth, and tenth floors. This means that the break contacts 3DR8, 5DR8, 5DR9, 8DR8, 8DR9, 9DR8, 5DR6, 5DR7, 8DR6, 8DR7, 9DR6, 9DR7, and 10DR6 are all open. Upon opening of each of these sets of contacts, the associated capacitor 90C or 91C began to receive a charge. It will be assumed that the down floor call at the third floor has been registered for a time sufficient to charge the associated capacitor to a voltage of ten volts. The down floor call at the fifth floor and the down floor call at the eighth floor have been registered for a time sufficient to charge each of the capacitors connected across the contacts 5DR8, 5DR9, 8DR8, 8DR9, 5DR6, 5DR7, 8DR6, and 8DR7 to a voltage of three volts. The down floor call at the ninth floor has been registered for a time sufficient to charge the capacitors connected across each of the sets of contacts 9DR8, 9DR9, 9DR6, and 9DR7 to one volt. The down floor call at the tenth floor has been registered for a time sufficient to charge the capacitor connected across the contacts 10DR6 to two volts. Each of the aforesaid voltages is represented on Figure 8 within a circle adjacent the associated capacitor. The polarities of each of the voltages also are represented in Figure 8 by the conventional markings, + for positive and − for negative.

In Figure 8, the contact arms y and t of the stepping relay are in positions corresponding to a low zone of five floors. The voltage between the contact arm t and the conductor 93 is found by addition to total thirteen volts, and the voltage is such that the contact arm t is negative with respect to the conductor.

The voltage between the contact arm y and the conductor 93 is found to total thirteen volts, and the contact arm y is negative with respect to the conductor 93. Since the voltages between the contact arms y and t are equal and opposite, the resultant voltage therebetween is zero. Inasmuch as the tubes 78 and 79 are biased to prevent firing thereof under such conditions, the relays RF and RR remain deenergized, and the contact arms y and t remain in the positions illustrated in Figure 8.

Let it be assumed next that the contact arms y and t are displaced one step to engage, respectively, the contacts y4 and t4. Under such conditions, the contact arm t would be negative with respect to the conductor 93 by ten volts. The contact arm y would be negative with respect to the conductor 93 by sixteen volts. Consequently, the contact arm t is positive with respect to the contact arm y by a resultant of six volts. Since the input to the tubes now makes the grid electrode of the tube 78 positive with respect to the associated cathode electrode, the tube fires to energize the relay RR.

It will be recalled that the energization of the relay RR results in the stepping of the stepping relay in a reverse or counterclockwise direction. When the contact arms y and t are stepped sufficiently to engage the contacts y5A and t5A, the voltage between the contact arms returns to zero, and the tube 78 again is biased to cutoff. Consequently, the stepping relay comes to rest with the contact arms in the positions illustrated in Figure 8.

When the positive bias was applied to the tube 78, an additional six volts of negative bias was applied to the tube 79. Consequently, the tube 79 did not fire.

Let it be assumed next that the contact arms y and t are in engagement, respectively, with the contacts y5 and t5. Under these circumstances the contact arm t would be negative with respect to the conductor 93 by sixteen volts, whereas the contact arm y would be negative with respect to the conductor 93 by ten volts. Consequently, the contact arm y would be positive with respect to the contact arm t by six volts. As a result of this input, the tube 79 fires to energize the relay RF. It will be recalled that this relay produces forward or clockwise rotation of the stepping relay, and such rotation moves the contact arms y and t into engagement with the contacts y5A and t5A, respectively. As a result of such movement, the voltage between the contact arms returns to zero and the tube 79 is extinguished. Therefore, the stepping relay remains in the position illustrated in Figure 8.

In this way the stepping relay always operates to a position which divides the floors into two zones having a predetermined relationship between the integrated times during which down floor calls from the respective zones remain unanswered.

The tendency of the system is to reduce the number of floors in the zone having the greater number of down floor calls which have remained unanswered for an unreasonably long period of time. Consequently, elevator service for such down floor calls is expedited.

Although the invention has been described with reference to certain specific embodiments thereof, numerous modifications falling within the spirit and scope of the invention are possible.

I claim as my invention:

1. In an elevator system, a structure having a plurality of landings, an elevator car, motive means for moving said elevator car relative to the structure for serving the landings, means for registering demands for service from said landings, dividing means responsive to demands for service registered from said landings for dividing the landings into a plurality of zones, the number of landings in each of the zones being dependent on the distribution of the demands from the landings for service, and assigning means for assigning the elevator car, when available, for serving primarily one of the zones.

2. A system as claimed in claim 1 wherein the dividing means is responsive to the number of the unanswered demands for service from each of said zones for controlling the number of the landings placed in each of the zones.

3. A system as claimed in claim 1 wherein the dividing means is responsive to a function of the number of the unanswered demands for service and the duration of unanswered demands for service from each of the zones for determining the number of landings in each of the zones.

4. A system as claimed in claim 1, wherein the dividing means is responsive to the demands for service in excess of a predetermined number for dividing the landings into zones having substantially the same number of demands for service.

5. A system as claimed in claim 1 wherein the elevator car is reversed after it has served the farthest demand for service therefrom in the zone to which it is assigned in a predetermined direction of travel of the elevator car.

6. A system as claimed in claim 1 wherein the number of the landings in the zones varies continuously in accordance with variations in the distribution of the total demands for service from the individual zones.

7. A system as claimed in claim 1 wherein the demands for service are divided substantially equally among the zones, and in the event that the demands for service cannot be divided equally the assignment to a predetermined one of the zones is increased in accordance with the remainder after the maximum equal division.

8. A system as claimed in claim 7 wherein the zones include an upper zone and a lower zone, said predetermined one of the zones being the lower one.

9. A system as claimed in claim 1 wherein the dividing means comprises a stepping switch having a stepping arm, and connections cooperating with the arm for establishing a dividing point between the zones, and operating means responsive to demands for service received from landings on a first side of the dividing point for moving the arm to select a new dividing point which decreases the number of landings in the zone on said first side of the dividing point.

10. A system as claimed in claim 9 wherein the dividing point is cancelled during movement of the arm to select a new dividing point.

11. A system as claimed in claim 1 wherein the elevator car is available for assignment when it is traveling in a first one of the zones towards a second one of the zones.

12. A system as claimed in claim 11 wherein the first one of the zones is a low zone and the second one of the zones is a high zone, in combination with car call means for stopping the car at landings desired by car passengers, and means responsive to the registration of a car call for a landing above the position of the car for requiring the elevator car to answer the car call before it can be assigned to a zone below the landing of the car call.

13. A system as claimed in claim 1 in combination with control means effective prior to said assignment for stopping and reversing the elevator car substantially at the farthest call for service therefrom in a predetermined direction of travel of the elevator car, said control means including means effective following said assignment of the elevator car for stopping and reversing the elevator car substantially at the farthest call for service therefrom in said predetermined direction in any of the zones to which the car is assigned.

14. A system as claimed in claim 1 wherein the assignment of the elevator car to one of the zones continues until the elevator car reverses at a predetermined terminal landing.

15. A system as claimed in claim 1 in combination with by-pass means operable from within the elevator car for by-passing calls for service, and means responsive to the operation of the by-pass means for cancelling the assignment of the elevator car to a zone.

16. A system as claimed in claim 1 wherein the elevator is movable in up and down directions between terminal landings and wherein the zones comprise a high zone and a low zone, in combination with by-pass means operable from within the elevator car for by-passing calls for service therefrom, means responsive to operation of the by-pass means while the elevator car is assigned to the low zone for cancelling the assignment, and means responsive to the arrival of the elevator car while assigned to the low zone at the lower terminal landing for cancelling the assignment.

17. A system as claimed in claim 1 in combination with means effective when the one of the zones requires assignment of the elevator car for preventing response of the elevator car to calls from the landings for service in a predetermined direction.

18. A system as claimed in claim 17 in combination with car call means operable from within the elevator car for registering calls for landings desired by car passengers, and means responsive to operation of the car call means requiring travel of the elevator car in said predetermined direction for permitting acceptance of the calls from the landings for service in said predetermined direction during said required travel of the elevator car.

19. In an elevator system, a structure having a pair of vertically-spaced terminal landings and a plurality of intermediate landings, an elevator car, motive means for moving the elevator car up and down between the terminal landings for serving the landings, up and down landing call-registering means at each of the intermediate landings for registering calls for elevator service from prospective passengers, control means responsive to calls registered by the landing call-registering means for stopping the elevator car when traveling up and down at landings approached by the elevator car for which up and down calls, respectively, are registered, dividing means responsive to calls registered by the down landing call-registering means for dividing the landings into a plurality of zones comprising a high zone and a low zone, said high zone and said low zone having substantially a predetermined balance of down registered landing calls, whereby the number of landings in said zones varies as required to maintain said balance, and assigning means for transferring the elevator car from service for all of the landings having registered landing calls to service for calls only in the low zone.

20. A system as claimed in claim 19 in combination with means effective while the low zone requires said transfer of the elevator car for preventing response of the elevator car to registered up landing calls.

21. A system as claimed in claim 19 in combination with car call means for registering calls for landings desired by car passengers, and means responsive to registration of a car call for preventing said transfer until the car call is answered.

22. A system as claimed in claim 19 wherein said predetermined balance places substantially equal numbers of down registered landing calls in each of the zones.

23. A system as claimed in claim 19 wherein said predetermined balance is based on a function representing the number of unanswered registered down calls and the time during which the registered down calls have remained unanswered, said balance dividing the landings between the zones to provide substantially equal functions in the zones.

24. A system as claimed in claim 19 wherein the dividing means is effective only if at least a predetermined number of down landing calls are registered.

25. A system as claimed in claim 19 wherein the assigning means is effective for said transferring of the elevator car only if the car is traveling up in the low zone.

26. A system as claimed in claim 19 in combination with car call means operable from within the elevator car for registering calls for landings desired by car passengers, said control means being responsive to calls registered by the landing means for stopping the elevator car when traveling up and down at landings for which car calls have been registered, means effective while the low zone requires said transfer for preventing the elevator car from answering up landing calls while traveling up in the low zone unless a car call is registered for a landing above the landing for which a landing call is registered, and means responsive to the presence of a registered car call for preventing said transferring of the elevator car.

27. In an elevator system, a structure having a pair of spaced terminal landings and a plurality of intermediate landings, a plurality of elevator cars, motive means for moving said elevator cars between the terminal landings for serving the landings, means for registering demands for service from the landings, dividing means responsive to demands for service registered from said landings for dividing the landings into a plurality of zones, the number of landings in each of the zones being dependent on the distribution of the demands from the landings for service, and assigning means for assigning each of the elevator cars for serving primarily one of the zones.

28. A system as claimed in claim 27 wherein the assigning means divides the elevator cars between the zones substantially in accordance with a predetermined plan.

29. A system as claimed in claim 27 wherein the landings are vertically spaced and the zones comprise a high zone and a low zone, said assigning means including means for dividing the elevator cars between the zones substantially in accordance with the needs of the zones for service, said assigning means if the service for the zones is substantially equal assigning the next available car to the high zone.

30. A system as claimed in claim 29 wherein the assigning means includes means responsive to assignment of each of the elevator cars to condition the assigned car to travel up to the highest registered call in the zone to which it is assigned, reverse and return to the lower terminal landing.

31. A system as claimed in claim 30 wherein the control means is effective prior to said assignment of each of said elevator cars to cause each unassigned car to travel up to the highest landing for which a call is registered, reverse and return to the lower terminal landing.

32. A system as claimed in claim 27 wherein the assigning means is responsive to the number of the elevator cars serving each of the zones for determining to which of the zones the next available car will be assigned.

33. A system as claimed in claim 27 wherein the terminal landings are vertically spaced and the zones comprise a high zone and a low zone, the assigning means includes means for counting the number of cars in the high zone and the number of cars in the low zone and set for down travel, and means responsive to the difference between said numbers for determining the zone to which the next available car will be assigned.

34. A system as claimed in claim 33 wherein said available car is a car set for up travel in the low zone.

35. A system as claimed in claim 33 in combination with car call means operable from within each of the cars for registering calls for landings desired by car passengers, said available car being a car set for up travel in the low zone with no unanswered car call registered therein.

36. A system as claimed in claim 33 wherein the assigning means includes means responsive to arrival of a down traveling low-zone car at the lower terminal landing for cancelling the assignment of the low-zone car to the low zone.

37. A system as claimed in claim 27 wherein the terminal landings are vertically spaced and the zones comprise a low zone and a high zone, in combination with means responsive to arrival of an elevator car assigned to the low zone at the lower terminal landing for cancelling the low zone assignment of the low-zone car.

38. A system as claimed in claim 37 in combination with by-pass means for each of the cars operable for causing each of the cars to pass landings at which demands for service have been registered, and means responsive to operation of the by-pass means of a car assigned to one of the zones for cancelling the assignment of the by-passed car.

39. A system as claimed in claim 32 in combination with by-pass means for each of the elevator cars operable for causing each of the cars to pass landings at which demands for service have been registered, and means responsive to operation of the by-pass means of a car assigned to one of the zones for cancelling the assignment of the by-passed car, whereby said by-passed car is not included in said number to which the assigning means responds.

40. In an elevator system having a structure comprising a pair of vertically-spaced terminal landings and a plurality of landings intermediate the terminal landings, a plurality of elevator cars, motive means for independently moving each of the cars between the terminal landings for serving the landings, up call means operable from each of the intermediate landings for registering calls for up elevator service from each of the intermediate landings, down call means operable from each of the intermediate landings for registering calls for down elevator service from each of the intermediate landings, and control means responsive to registered calls from the intermediate landings for stopping the first available up-traveling elevator at each intermediate landing for which an up call is registered, and for stopping the first available down-traveling elevator car at each intermediate landing for which a down call is registered, the combination therewith of means for dividing the landings into a high zone and a low zone, and assigning means responsive to the load demands of said zones for dividing said elevator cars into high-zone and low-zone elevator cars for primarily serving, respectively, said high and low zones of landings, said assigning means comprising means responsive to the load requirements of the zones for assigning each elevator car as it becomes available to the zone in most urgent need of additional service.

41. A system as claimed in claim 40 wherein said assigning means substantially continuously compares the numbers of the cars assigned to each of the zones and maintains substantially a predetermined balance between said numbers.

42. A system as claimed in claim 40 wherein the dividing means substantially continuously compares the number of unanswered down calls registered in each of the zones and substantially continuously divides the landings between the zones to maintain substantially a predetermined balance between the unanswered registered down calls in the zones.

43. A system as claimed in claim 42 wherein the dividing means comprises a stepping relay, and means controlled by registered down calls for stepping the relay in a different direction for each of the zones.

44. A system as claimed in claim 42 wherein the assigning means includes means for substantially continuously comparing the numbers of the cars assigned to each of the zones to maintain substantially a pre-determined balance between the numbers.

45. A system as claimed in claim 40 wherein the dividing means includes means for substantially continuously comparing the numbers of unanswered down calls registered in each zone and the times during which such unanswered down calls have remained unanswered for adjusting the number of landings in each of the zones in order to maintain substantially a pre-determined balance between the zones of the numbers and times of the unanswered registered down calls.

46. A system as claimed in claim 40 wherein the control means includes first means responsive to a down call which is the highest registered call for stopping and reversing an up-traveling elevator car at the landing of such highest registered call, and second means cooperating with the first means in response to the need of the assigning means for an elevator car to be assigned to the low zone for stopping and reversing an up-traveling high-zone elevator car at the landing of a registered down call which is the highest down call in the high zone and for stopping and reversing an up-traveling low-zone car at the landing of a registered down call which is the highest down call in the low zone.

47. A system as claimed in claim 42 wherein the control means includes first means responsive to a down call which is the highest registered call for stopping and reversing an up-traveling elevator car at the landing of such highest registered call, and second means cooperating with the first means in response to the need of the assigning means for an elevator car to be assigned to the low zone for stopping and reversing an up-traveling high-zone elevator car at the landing of a registered down call which is the highest down call in the high zone and for stopping and reversing an up-traveling low-zone car at the landing of a registered down call which is the highest down call in the low zone.

48. A system as claimed in claim 40 wherein the means for dividing the landings effects such division only if at least a predetermined number of down calls greater than one are registered.

49. A system as claimed in claim 40 wherein the landings are divided between the zones to allocate as nearly as possible equal numbers of registered down calls in the zones, any remainder left after dividing the registered down calls by the number of zones being represented by landings having registered down calls allocated to a predetermined one of the zones.

50. A system as claimed in claim 40 in combination with means responsive to requirement of a car by a predetermined one of the zones for preventing response by the cars to registered up landing calls during up travel of the cars.

51. A system as claimed in claim 41 wherein the numbers compared by the assigning means are the number of high-zone cars and the number of down-directed low-zone cars.

52. A system as claimed in claim 40 in combination with by-pass means for each of the elevator cars assigned to the low zone operable for preventing response by the low-zone car to registered landing down calls, and means responsive to operation of the by-pass means of a low-zone car for cancelling the low zone assignment of the by-passed car.

53. A system as claimed in claim 40 in combination with means responsive to arrival of each low-zone car at the lower terminal landing for cancelling the low zone assignment of such arriving car.

54. A system as claimed in claim 53 in combination with by-pass means for each of the elevator cars assigned to the low zone operable for preventing response by the low-zone car to registered landing down calls, and means responsive to operation of the by-pass means of a low-zone car for cancelling the low zone assignment of the by-passed car.

55. In an elevator system having a structure comprising a pair of vertically spaced terminal landings and a plurality of landings intermediate the terminal landings, a plurality of elevator cars, motive means for independently moving each of the cars between the terminal landings for serving the landings, up call means operable from each of the intermediate landings for registering calls for up elevator service from each of the intermediate landings, down call means operable from each of the intermediate landings for registering calls for down elevator service from each of the intermediate landings, car call means operable from within each of the elevator cars for registering car calls for landings desired by car passengers, and control means responsive to registered calls from the intermediate landings or registered car calls for stopping the first available up-traveling elevator at each intermediate landing for which an up call is registered or for which a car call is registered and for stopping the first available down-traveling elevator car at each intermediate landing for which a down call is registered or for which a car call is registered, the combination therewith of means responsive to a predetermined number of registered down calls for dividing the landings into a high zone and a low zone, and assigning means responsive to the load demands of said zones for dividing said elevator cars into high-zone and low-zone elevator cars for primarily serving, respectively, said high and low zones of landings, each of the elevator cars being available for assignment to the low zone when set for up travel in the low zone, said assigning means comprising means responsive to the load requirements for assigning each elevator car as it becomes available to one of the zones.

56. A system as claimed in claim 55 in combination with means responsive to an unanswered car call registered in an elevator car set for up travel in the low zone for preventing the last-named elevator car from being assigned to the low zone by the assigning means.

57. A system as claimed in claim 55 in combination with means responsive to an operation of the dividing means for preventing response to registered up landing calls by an available elevator car.

58. A system as claimed in claim 57 in combination with means responsive to registration of an unanswered car call in one of the elevator cars set for up travel for requiring the last-named elevator car to respond to registered up landing calls.

59. A system as claimed in claim 57 wherein the dividing means comprises means for comparing substantially continuously the down calls in the high zone with the down calls in the low zone and dividing the landings between the zones to maintain substantially continuously a substantially predetermined balance between the down calls in the two zones.

60. A system as claimed in claim 59 wherein any elevator car assigned to the low zone has its assignment cancelled in response to arrival of the elevator car at the lower terminal landing.

61. A system as claimed in claim 60 wherein said assignment means comprises means for maintaining substantially a predetermined balance between elevator cars assigned to the two zones.

62. A system as set forth in claim 60 wherein the dividing means comprises means responsive to the presence of at least a predetermined minimum number of down calls for effectively establishing said zones of landings, said control means comprising first means effective when the system is not on zone operation for reversing each of the elevator cars when traveling up at a down call or a car call which is the highest registered call, and said control means comprising second means cooperating with the first means when the system is on zone operation for reversing each of the elevator cars assigned to the low zone when traveling up at a down call which is the highest registered down call in the low zone even though calls are registered for landings above the low zone.

63. In an elevator system a structure having terminal landings and a plurality of landings intermediate the terminal landings, a plurality of elevator cars, motive means for moving the elevator cars relative to the structure to serve the landings, control means conditioning all of the elevator cars for similar operation to serve the landings, and modifying means operable for modifying the control means to divide the intermediate landings into a plurality of zones, with the dividing plane between adjacent zones varying in accordance with a predetermined variable condition, said modifying means cooperating with the control means to provide specialized service by said elevator cars for each of the zones.

64. In an elevator system a structure having terminal landings and a plurality of landings intermediate the terminal landings, a plurality of elevator cars, motive means for moving the elevator cars relative to the structure to serve the landings, up call means operable for registering an up call for service from each of the intermediate landings, means operable for registering a down call for service from each of the intermediate landings, control means conditioning all of the elevator cars for similar operation to answer calls registered by the call means, and modifying means operable for modifying the control means to divide the intermediate landings into a plurality of zones, with the dividing plane between adjacent zones varying to maintain a predetermined distribution of calls for service registered by the call means, said modifying means cooperating with the control means to assign the elevator cars to provide a distinctive service trip for each of the zones.

65. A system as claimed in claim 64 wherein the zones include a low zone of landings and a high zone of landings, said modifying means cooperating with the control means to reverse an up-traveling one of the elevator cars which is not assigned to the low zone at the highest call for service in the up direction, said modifying means cooperating with the control means to reverse an up-traveling one of the elevator cars assigned for low zone operation at the highest call from a low zone landing for service in the down direction even though service calls are registered for landings in the high zone.

66. In an elevator system, a structure having a pair of spaced terminal landings and a plurality of intermediate landings, an elevator car, motive means for moving the elevator car in first and second directions for serving the landings, first landing call registering means operable from each of the intermediate landings for registering calls from prospective passengers desiring transportation in said first direction, second landing call registering means operable from each of the intermediate landings for registering calls from prospective passengers desiring transportation in the second direction, control means responsive to calls registered by the first and second landing call registering means for stopping the elevator car during travel in the first direction at the landings for which calls are registered by the first landing call registering means and for stopping the elevator car during travel in the second direction at landings for which calls are registered by the second landing call registering means, car call means for registering calls for landings desired by car passengers, said control means including means responsive to the car call means for stopping the elevator car at landings for which calls are registered by the car call means, and means cooperating with the control means for stopping the elevator car when traveling in the first direction at the farthest landing in said first direction for which a call is registered by the car call means or the second landing call registering means, whichever is farther, even though a call for a still farther landing in the first direction is registered by the first landing call registering means.

67. A system as claimed in claim 66 in combination with means responsive to the stopping of the elevator car when traveling in the first direction at the farthest landing in the first direction for which a call is registered by the car call means or the second landing call registering means, whichever is farther, for conditioning the elevator car for movement in the second direction.

68. In an elevator system, a structure having a pair of vertically spaced terminal landings and a plurality of intermediate landings, a plurality of elevator cars, motive means for moving each of the elevator cars in up and down directions for serving the landings, up landing call registering means operable from each of the intermediate landings for registering calls from prospective passengers desiring transportation in said up direction, down landing call registering means operable from each of the intermediate landings for registering calls from prospective passengers desiring transportation in the down direction, control means responsive to calls registered by the up and down landing call registering means for stopping each of the elevator cars during travel in the up direction at the landings for which calls are registered by the up landing call registering means and for stopping each of the elevator cars during travel in the down direction at landings for which calls are registered by the down landing call registering means, car call means associated with each of the cars for registering calls for landings desired by car passengers, said control means including means responsive to each of the car call means for stopping the associated elevator car at landings for which calls are registered by the car call means, and means cooperating with the control means for stopping each of the elevator cars when traveling in the up direction at the farthest landing in said up direction for which a call is registered by the associated car call means or the down landing call registering means, whichever is farther, even though a call for a still farther landing in the up direction is registered by the up landing call registering means, and means responsive to the last-named stopping of one of the elevator cars for conditioning such elevator car for down travel.

69. In an elevator system, a structure having a plurality of landings, an elevator car, means for moving the elevator car in first and second directions for serving said landings, first call registering means at each of the landings for registering calls for elevator service in the first direction, second call registering means at each of the landings for registering calls for elevator service in the second direction, control means responsive to calls registered by the landing call registering means for stopping the elevator car while traveling in said first and second directions at landings approached by the elevator car for which calls have been registered respectively by the first and second call registering means, farthest-call means effective in cooperation with the control means for stopping the car at the farthest of the landings in the first direction for which a call is registered by any of the call-registering means, when the elevator car approaches said farthest of the landings in the first direction, and means responsive to a predetermined condition for modifying said high call means to stop the elevator car when traveling in the first direction at the farthest of the landings for which a call has been registered by the second call-registering means even though a call is registered by the first call-registering means for a still farther landing in said first direction.

70. An elevator system as claimed in claim 69 in combination with reversing means for reversing the direction of travel of the elevator car, said reversing means being responsive to the stopping of the elevator car while traveling in the first direction at a landing in response to the second call-registering means of the last-named landing for conditioning the elevator car for travel in the second direction.

71. In an elevator system, a structure having a plurality of landings, an up call registering relay for each of said landings, a down call registering relay for each of the landings, each of the relays having a set of break contacts, the two sets of break contacts for any landing being designated as a pair, a high call circuit having said break contacts connected in series therein, said pairs being arranged successively in said high call circuit in the order of said landings, an elevator car, means mounting the elevator car for movement relative to the structure to serve said landings, car control means including means movable in accordance with movement of the elevator car for establishing a connection to the high call circuit at a point which corresponds to the position of the elevator car, and selectively-operable means for shunting one of the sets of said break contacts in each of said pairs, the shunted sets being corresponding sets of the break contacts.

72. An elevator system as claimed in claim 71 wherein said shunt means is responsive to a predetermined condition of the elevator system for establishing said shunting of the break contacts.

73. In an elevator system a structure having a plurality of zones of landings, an elevator car, means mounting the elevator car for movement relative to the structure to serve the landings, and assigning means operable on each of a plurality of trips of the elevator car to assign the elevator car to provide specialized service for any of said zones, said assigning means being responsive to a predetermined condition for determining the specific zone to which the elevator car will be assigned on each of said trips.

74. In an elevator system, a structure having a plurality of zones of landings, a plurality of elevator cars, means mounting the elevator cars for movement relative to the structure to serve the landings, and assigning means operable on each of a plurality of trips of the elevator cars to assign each of the elevator cars to provide specialized service for any of said zones, said assigning means being responsive to the distribution of the elevator cars between the zones for determining to which zone the next available one of the elevator cars is assigned.

75. In an elevator system, a structure having a plurality of landings, call means for registering calls for service for each of the landings, and dividing means for dividing said landings into zones for receiving specialized service, said dividing means comprising a plurality of arms each associated with a separate zone of the landings, each of the arms having a characteristic dependent on a function of the number of calls for service registered for the landings represented by such arm, and modifying means responsive to the characteristics of the arms for modifying the landings associated with each of the zones to maintain a predetermined relationship between said characteristics.

76. A system as claimed in claim 75 wherein the arms comprise two arms of a bridge circuit, each of the arms having an impedance dependent on a function of the number of calls for service registered for the landings associated with such arm, said modifying means being responsive to the presence of an unbalance in the bridge circuit for restoring the balance of the bridge circuit.

77. A system as claimed in claim 75 wherein each of said arms comprises a separate source of electric voltage representative of the time during which a call for service has been registered for each of the landings represented by such arm, said modifying means maintaining a predetermined relationship between the resultant voltages of the arms.

WILLIAM F. EAMES.

No references cited.